(12) United States Patent
Reid et al.

(10) Patent No.: US 8,763,229 B2
(45) Date of Patent: Jul. 1, 2014

(54) EXPANDABLE CRACK INHIBITOR METHOD

(75) Inventors: Leonard Frederick Reid, Renton, WA (US); Kevin J. Dooley, Issaquah, WA (US)

(73) Assignee: Fatigue Technology, Inc., Seattle, WA (US)

( * ) Notice: Subject to any disclaimer, the term of this patent is extended or adjusted under 35 U.S.C. 154(b) by 52 days.

(21) Appl. No.: 13/488,295

(22) Filed: Jun. 4, 2012

(65) Prior Publication Data

US 2012/0304577 A1 Dec. 6, 2012

Related U.S. Application Data

(60) Provisional application No. 61/520,057, filed on Jun. 3, 2011.

(51) Int. Cl.
*B23P 6/00* (2006.01)
*B23P 6/04* (2006.01)

(52) U.S. Cl.
USPC ............. 29/402.01; 29/402.06; 29/402.09; 29/402.11; 29/522.1; 29/523; 52/514

(58) Field of Classification Search
USPC ........... 29/402.01, 402.06, 402.09, 402.11, 29/402.19, 406, 522.1, 523; 52/514
See application file for complete search history.

(56) References Cited

U.S. PATENT DOCUMENTS

| 295,593 | A | 3/1884 | Thayer |
| 810,430 | A | 1/1906 | Pfluger et al. |
| 1,081,496 | A | 12/1913 | Gillmor |
| 1,106,964 | A | 8/1914 | Pahler |
| 1,226,090 | A | 5/1917 | Ludlum |
| 1,297,142 | A | 3/1919 | Gibbons |
| 1,480,298 | A | 1/1924 | Pearson |
| 1,881,867 | A | 10/1932 | Nelson |
| 1,979,686 | A | 11/1934 | Hall et al. |
| 2,092,358 | A | 9/1937 | Robertson |
| 2,146,461 | A | 2/1939 | Bettington |

(Continued)

FOREIGN PATENT DOCUMENTS

| AU | 2007204888 B2 | 7/2007 |
| BR | PI0706509-4 A2 | 3/2011 |

(Continued)

OTHER PUBLICATIONS

Callinan, R.J.; Wang, C.H.; Sanderson, S.; "Analysis of Fatigue Crack Growth from Cold-expanded/interference Fitted Stop Drilled Holes", Jul. 1998, Aeronautical and Maritime Research Laboratory, pp. 1-29.*

(Continued)

*Primary Examiner* — Jermie Cozart
(74) *Attorney, Agent, or Firm* — Seed IP Law Group PLLC

(57) ABSTRACT

One or more crack inhibitors can be installed to improve fatigue performance by producing stress states that prevent or inhibit crack initiation. Crack inhibitors can also prevent or retard crack growth. A mandrel can be used to radially expand the crack inhibitors to both induce compressive residual stresses and to form an interference fit between the crack inhibitor and a workpiece. The mandrel can be removed from the installed crack inhibitor, which is left in the workpiece to ensure proper stress states are maintained.

10 Claims, 21 Drawing Sheets

(56) References Cited

U.S. PATENT DOCUMENTS

| | | |
|---|---|---|
| 2,150,361 A | 3/1939 | Chobert |
| 2,188,596 A | 1/1940 | Hobert |
| 2,275,451 A | 3/1942 | Maxwell |
| 2,282,711 A | 5/1942 | Eklund |
| 2,357,123 A | 8/1944 | Maxwell |
| 2,385,294 A | 9/1945 | Lowy |
| 2,405,399 A | 8/1946 | Bugg et al. |
| 2,430,554 A | 11/1947 | Bugg et al. |
| 2,433,425 A | 12/1947 | Burckle |
| 2,468,985 A | 5/1949 | Krotz |
| 2,501,567 A | 3/1950 | Huck |
| 2,528,180 A | 10/1950 | Roehl |
| 2,538,623 A | 1/1951 | Keating |
| 2,583,719 A | 1/1952 | White |
| 2,608,751 A | 9/1952 | Hutton |
| 2,661,182 A | 12/1953 | Kipp |
| 2,672,175 A | 3/1954 | Howard |
| 2,695,446 A | 11/1954 | Meyer |
| 2,700,172 A | 1/1955 | Rohe |
| 2,808,643 A | 10/1957 | Weatherhead, Jr. |
| 2,887,003 A | 5/1959 | Brilmyer |
| 2,943,667 A | 7/1960 | Ewing et al. |
| 3,107,572 A | 10/1963 | Orloff |
| 3,128,999 A | 4/1964 | Schmitt |
| 3,129,630 A | 4/1964 | Wing et al. |
| 3,137,887 A | 6/1964 | Mannino et al. |
| 3,149,860 A | 9/1964 | Hallesy |
| 3,164,054 A | 1/1965 | Biesecker |
| 3,222,977 A | 12/1965 | Vaughn |
| 3,244,034 A | 4/1966 | Severdia |
| 3,252,493 A | 5/1966 | Smith |
| 3,262,353 A | 7/1966 | Waeltz et al. |
| 3,290,770 A | 12/1966 | Silverman et al. |
| 3,345,730 A | 10/1967 | Laverty |
| 3,358,492 A | 12/1967 | Richter |
| 3,377,907 A | 4/1968 | Hurd |
| 3,399,435 A | 9/1968 | Ackerman |
| 3,434,746 A | 3/1969 | Watts |
| 3,443,474 A | 5/1969 | Blakeley et al. |
| 3,498,648 A | 3/1970 | Hallesy |
| 3,537,163 A | 11/1970 | Steidl |
| 3,566,662 A | 3/1971 | Champoux |
| 3,578,367 A | 5/1971 | Harvill et al. |
| 3,596,948 A | 8/1971 | Spoehr |
| 3,601,771 A | 8/1971 | Dozier |
| 3,643,544 A | 2/1972 | Massa |
| 3,657,956 A | 4/1972 | Bradley et al. |
| 3,674,292 A | 7/1972 | Demler, Sr. |
| 3,677,684 A | 7/1972 | Platz |
| 3,678,535 A | 7/1972 | Charles |
| 3,693,247 A | 9/1972 | Brown |
| 3,695,324 A | 10/1972 | Gulistan |
| 3,763,541 A | 10/1973 | Jaffe |
| 3,765,078 A | 10/1973 | Gulistan |
| 3,778,090 A | 12/1973 | Tobin |
| 3,787,945 A | 1/1974 | Pasek et al. |
| 3,820,297 A | 6/1974 | Hurd |
| 3,835,525 A | 9/1974 | King, Jr. |
| 3,835,688 A | 9/1974 | King, Jr. |
| 3,837,208 A | 9/1974 | Davis et al. |
| 3,875,649 A | 4/1975 | King, Jr. |
| 3,878,760 A | 4/1975 | Jeal et al. |
| 3,879,980 A | 4/1975 | King, Jr. |
| 3,892,121 A | 7/1975 | Champoux et al. |
| 3,895,409 A | 7/1975 | Kwatonowski |
| 3,915,052 A | 10/1975 | Ruhl |
| 3,934,325 A | 1/1976 | Jaffe |
| 3,943,748 A | 3/1976 | King, Jr. |
| 3,949,535 A | 4/1976 | King, Jr. |
| 3,997,193 A | 12/1976 | Tsuda et al. |
| 4,003,288 A | 1/1977 | Jeal |
| 4,044,591 A | 8/1977 | Powderley |
| 4,089,247 A | 5/1978 | Dahl et al. |
| 4,142,439 A | 3/1979 | Landt |
| 4,143,580 A | 3/1979 | Luhm |
| 4,157,675 A | 6/1979 | King, Jr. |
| 4,164,807 A | 8/1979 | King, Jr. |
| 4,168,650 A | 9/1979 | Dahl et al. |
| 4,186,787 A | 2/1980 | Husain |
| 4,187,708 A | 2/1980 | Champoux |
| 4,230,017 A | 10/1980 | Angelosanto |
| 4,237,768 A | 12/1980 | Volkmann |
| 4,249,786 A | 2/1981 | Mahoff |
| 4,295,691 A | 10/1981 | Rubenthaler |
| 4,355,612 A | 10/1982 | Luksch |
| 4,364,697 A | 12/1982 | Binns |
| 4,370,081 A | 1/1983 | Briles |
| 4,371,154 A | 2/1983 | Winbigler |
| 4,386,515 A | 6/1983 | Starke |
| 4,397,061 A | 8/1983 | Kanzaka |
| 4,405,256 A | 9/1983 | King, Jr. |
| 4,423,619 A | 1/1984 | Champoux |
| 4,425,780 A | 1/1984 | Champoux |
| 4,447,944 A | 5/1984 | Mohrman |
| 4,457,652 A | 7/1984 | Pratt |
| 4,471,643 A | 9/1984 | Champoux et al. |
| 4,482,089 A | 11/1984 | Lindahl et al. |
| 4,491,358 A | 1/1985 | Choung |
| 4,494,398 A | 1/1985 | Svoboda |
| 4,522,378 A | 6/1985 | Nelson |
| 4,524,600 A | 6/1985 | Champoux et al. |
| 4,530,527 A | 7/1985 | Holmberg |
| 4,557,033 A | 12/1985 | Champoux |
| 4,557,650 A | 12/1985 | Molina |
| 4,579,491 A | 4/1986 | Kull |
| 4,583,388 A | 4/1986 | Hogenhout |
| 4,595,324 A | 6/1986 | Sadri |
| 4,597,282 A | 7/1986 | Hogenhout |
| 4,609,315 A | 9/1986 | Briles |
| 4,627,775 A | 12/1986 | Dixon |
| 4,640,479 A | 2/1987 | Shely et al. |
| 4,659,271 A | 4/1987 | Pratt et al. |
| 4,659,272 A | 4/1987 | Pratt |
| 4,665,732 A | 5/1987 | Hogenhout |
| 4,678,384 A | 7/1987 | Sparling et al. |
| 4,699,212 A | 10/1987 | Andersson et al. |
| 4,699,552 A | 10/1987 | Jeal |
| 4,702,655 A | 10/1987 | Kendall |
| 4,732,518 A | 3/1988 | Toosky |
| 4,752,169 A | 6/1988 | Pratt |
| 4,755,904 A | 7/1988 | Brick |
| 4,759,237 A | 7/1988 | Fauchet et al. |
| 4,787,793 A | 11/1988 | Harris |
| 4,809,420 A | 3/1989 | Landy et al. |
| 4,832,548 A | 5/1989 | Strobel |
| 4,869,091 A | 9/1989 | Shemeta |
| 4,872,332 A | 10/1989 | Potzas |
| 4,877,363 A | 10/1989 | Williamson et al. |
| 4,885,829 A | 12/1989 | Landy |
| 4,900,205 A | 2/1990 | Sadri |
| 4,905,766 A | 3/1990 | Dietz et al. |
| 4,934,038 A | 6/1990 | Caudill |
| 4,934,170 A | 6/1990 | Easterbrook et al. |
| 4,950,115 A | 8/1990 | Sadri |
| 4,967,463 A | 11/1990 | Pratt |
| 4,985,979 A | 1/1991 | Speakman |
| 4,999,896 A | 3/1991 | Mangus et al. |
| 5,025,128 A | 6/1991 | Derbyshire |
| 5,038,596 A | 8/1991 | Noonan et al. |
| 5,066,179 A | 11/1991 | Pratt |
| 5,069,586 A | 12/1991 | Casey |
| 5,083,363 A | 1/1992 | Ransom et al. |
| 5,093,957 A | 3/1992 | Do |
| 5,096,349 A | 3/1992 | Landy et al. |
| 5,103,548 A | 4/1992 | Reid et al. |
| 5,110,163 A | 5/1992 | Benson et al. |
| 5,123,792 A | 6/1992 | Strobel |
| 5,127,254 A | 7/1992 | Copple et al. |
| 5,129,253 A | 7/1992 | Austin et al. |
| 5,178,502 A | 1/1993 | Sadri |
| 5,207,461 A | 5/1993 | Lasko |
| 5,213,460 A | 5/1993 | Sadri et al. |
| 5,218,854 A | 6/1993 | Jarzebowicz et al. |
| 5,238,342 A | 8/1993 | Stencel |

(56) References Cited

U.S. PATENT DOCUMENTS

| | | |
|---|---|---|
| 5,245,743 A | 9/1993 | Landy et al. |
| 5,253,773 A | 10/1993 | Choma et al. |
| 5,256,017 A | 10/1993 | Smirnov et al. |
| 5,305,627 A | 4/1994 | Quincey et al. |
| 5,341,559 A | 8/1994 | Reid et al. |
| 5,350,266 A | 9/1994 | Espey et al. |
| 5,380,111 A | 1/1995 | Westrom |
| 5,380,136 A | 1/1995 | Copple et al. |
| 5,390,808 A | 2/1995 | Choma et al. |
| 5,399,052 A | 3/1995 | Volkmann et al. |
| 5,405,228 A | 4/1995 | Reid et al. |
| 5,433,100 A | 7/1995 | Easterbrook et al. |
| 5,466,016 A | 11/1995 | Briody et al. |
| 5,468,104 A | 11/1995 | Reid et al. |
| 5,478,122 A | 12/1995 | Seabra |
| 5,496,140 A | 3/1996 | Gossmann et al. |
| 5,498,110 A | 3/1996 | Stencel et al. |
| 5,607,194 A | 3/1997 | Ridenour |
| 5,609,434 A | 3/1997 | Yehezkieli et al. |
| 5,632,582 A | 5/1997 | Gauron |
| 5,634,751 A | 6/1997 | Stencel et al. |
| 5,666,710 A | 9/1997 | Weber et al. |
| 5,702,215 A | 12/1997 | Li |
| 5,713,611 A | 2/1998 | Kurimoto et al. |
| 5,722,312 A | 3/1998 | Kristensen |
| 5,806,173 A | 9/1998 | Honma et al. |
| 5,813,808 A | 9/1998 | Wu |
| 5,816,761 A | 10/1998 | Cassatt et al. |
| 5,860,213 A | 1/1999 | Knudson |
| 5,885,318 A | 3/1999 | Shimizu et al. |
| 5,943,898 A | 8/1999 | Kuo |
| 5,947,326 A | 9/1999 | O'Hern et al. |
| 5,947,667 A | 9/1999 | Cassatt et al. |
| 6,036,418 A | 3/2000 | Stencel et al. |
| 6,058,562 A | 5/2000 | Satou et al. |
| 6,077,009 A | 6/2000 | Hazelman |
| 6,077,010 A | 6/2000 | Reid et al. |
| 6,131,964 A | 10/2000 | Sareshwala |
| 6,183,180 B1 | 2/2001 | Copple et al. |
| 6,217,082 B1 | 4/2001 | Orcutt et al. |
| 6,266,991 B1 | 7/2001 | Kuo |
| 6,289,577 B1 | 9/2001 | Tanaka et al. |
| 6,325,582 B1 | 12/2001 | Sadri et al. |
| 6,328,513 B1 | 12/2001 | Niwa et al. |
| 6,347,663 B1 | 2/2002 | Hunzinger et al. |
| 6,487,767 B1 | 12/2002 | Reid et al. |
| 6,488,460 B1 | 12/2002 | Smith et al. |
| 6,499,926 B2 | 12/2002 | Keener |
| 6,537,005 B1 | 3/2003 | Denham |
| 6,623,048 B2 | 9/2003 | Castel et al. |
| 6,651,301 B1 | 11/2003 | Liu |
| 6,705,149 B2 | 3/2004 | Cobzaru et al. |
| 6,761,380 B2 | 7/2004 | Pachciarz et al. |
| 6,773,039 B2 | 8/2004 | Muenster et al. |
| 6,792,657 B2 | 9/2004 | Reid et al. |
| 6,796,765 B2 | 9/2004 | Kosel et al. |
| 6,826,820 B2 | 12/2004 | Denham et al. |
| RE38,788 E | 9/2005 | Satou et al. |
| 6,990,722 B2 | 1/2006 | Reid et al. |
| 7,024,908 B2 | 4/2006 | Poast et al. |
| 7,024,909 B2 | 4/2006 | Cobzaru et al. |
| 7,047,596 B2 | 5/2006 | Sucic et al. |
| 7,059,816 B2 | 6/2006 | Toosky |
| 7,100,264 B2 | 9/2006 | Skinner et al. |
| 7,127,792 B2 | 10/2006 | Wakamori et al. |
| 7,156,051 B2 | 1/2007 | Lorton et al. |
| 7,273,338 B2 | 9/2007 | Summerlin |
| 7,303,366 B2 | 12/2007 | Smith |
| 7,325,796 B2 | 2/2008 | Moreland |
| 7,375,277 B1 | 5/2008 | Skinner et al. |
| 7,406,777 B2 | 8/2008 | Grover et al. |
| 7,448,652 B2 | 11/2008 | Poast et al. |
| 7,509,829 B2 | 3/2009 | Johnson |
| 7,575,404 B2 | 8/2009 | Toosky et al. |
| 7,617,712 B2 | 11/2009 | Glenn |
| 7,641,430 B2 | 1/2010 | Johnson et al. |
| 7,695,226 B2 | 4/2010 | March et al. |
| 7,926,318 B2 | 4/2011 | Glenn |
| 7,926,319 B2 | 4/2011 | Johnson |
| 7,946,628 B2 | 5/2011 | Poast et al. |
| 8,061,178 B2 | 11/2011 | Glenn |
| 8,069,699 B2 | 12/2011 | Glenn et al. |
| 8,117,885 B2 | 2/2012 | Glenn |
| 8,191,395 B2 | 6/2012 | Glenn |
| 8,297,897 B2 | 10/2012 | Auriol et al. |
| 8,312,606 B2 | 11/2012 | Reid et al. |
| 8,322,015 B2 | 12/2012 | Pratt et al. |
| 8,348,566 B2 | 1/2013 | Pratt |
| 8,353,193 B2 | 1/2013 | Johnson |
| 8,387,436 B2 | 3/2013 | Glenn |
| 8,402,806 B2 | 3/2013 | Glenn et al. |
| 8,506,222 B2 | 8/2013 | Reid et al. |
| 2003/0110618 A1 | 6/2003 | Magnuson |
| 2004/0111864 A1 | 6/2004 | Skinner et al. |
| 2004/0213492 A1 | 10/2004 | Kim et al. |
| 2006/0045649 A1 | 3/2006 | Johnson et al. |
| 2006/0251490 A1 | 11/2006 | Kleinman et al. |
| 2007/0110541 A1 | 5/2007 | Rawlins et al. |
| 2007/0224016 A1 | 9/2007 | Toosky et al. |
| 2007/0266756 A1 | 11/2007 | Shuster et al. |
| 2007/0289351 A1 | 12/2007 | Glenn |
| 2008/0005887 A1 | 1/2008 | Glenn et al. |
| 2008/0034831 A1 | 2/2008 | Glenn |
| 2008/0066518 A1 | 3/2008 | Glenn et al. |
| 2008/0250603 A1 | 10/2008 | Skinner et al. |
| 2009/0304315 A1 | 12/2009 | Johnson |
| 2010/0000280 A1 | 1/2010 | Reid et al. |
| 2010/0260572 A1 | 10/2010 | Wehrmeister et al. |
| 2011/0150599 A1 | 6/2011 | Bakken et al. |
| 2011/0182689 A1 | 7/2011 | Avetisian |
| 2012/0317787 A1 | 12/2012 | Ross et al. |
| 2013/0192331 A1 | 8/2013 | Ross et al. |
| 2013/0200543 A1 | 8/2013 | Ross et al. |
| 2013/0204422 A1 | 8/2013 | Ross et al. |
| 2013/0239399 A1 | 9/2013 | Reid et al. |

FOREIGN PATENT DOCUMENTS

| | | |
|---|---|---|
| CN | 1846092 A | 10/2006 |
| DE | 2203217 | 7/1973 |
| DE | 3301849 C1 | 7/1984 |
| DE | 3545554 A1 | 7/1987 |
| DE | 8901317 U1 | 3/1989 |
| EP | 0054592 A1 | 6/1982 |
| EP | 0248122 A2 | 12/1987 |
| EP | 0581385 B1 | 5/1997 |
| EP | 0785366 A1 | 7/1997 |
| EP | 0643231 B1 | 12/1998 |
| EP | 0891007 A1 | 1/1999 |
| EP | 0696686 B1 | 7/1999 |
| EP | 0945919 B1 | 9/1999 |
| EP | 1166951 A1 | 1/2002 |
| EP | 1202458 A1 | 5/2002 |
| EP | 1525952 A1 | 4/2005 |
| EP | 1061276 B1 | 9/2005 |
| EP | 1611976 A1 | 1/2006 |
| EP | 1624202 A2 | 2/2006 |
| EP | 1032769 B1 | 5/2006 |
| EP | 1779964 A1 | 5/2007 |
| EP | 1803526 A1 | 7/2007 |
| EP | 1872895 A2 | 1/2008 |
| EP | 1903221 A2 | 3/2008 |
| EP | 1751432 B1 | 7/2008 |
| EP | 1893875 B1 | 3/2011 |
| EP | 1280621 B1 | 10/2011 |
| EP | 2388104 A1 | 11/2011 |
| EP | 2019739 B1 | 12/2011 |
| EP | 1644142 B1 | 10/2012 |
| EP | 2568183 A2 | 3/2013 |
| EP | 2061626 B1 | 4/2013 |
| EP | 1651365 B1 | 6/2013 |
| FR | 2645052 | 10/1990 |
| GB | 593607 | 10/1947 |
| GB | 1395009 | 5/1975 |

(56) References Cited

FOREIGN PATENT DOCUMENTS

| | | | |
|---|---|---|---|
| GB | 2239917 A | 7/1991 |
| JP | 57137031 | 8/1982 |
| JP | 60238046 A | 11/1985 |
| JP | 61157846 | 7/1986 |
| JP | 09-072097 | 3/1997 |
| JP | 10-274366 | 10/1998 |
| JP | 10-299735 | 11/1998 |
| JP | 2001-177964 | 6/2001 |
| JP | 2004-176254 | 6/2004 |
| JP | 2007-500828 A | 1/2007 |
| JP | 2009-535218 A | 10/2009 |
| JP | 2009-535577 A | 10/2009 |
| JP | 2011-513672 A | 4/2011 |
| KR | 10-2009-0064401 A | 6/2009 |
| SU | 632463 | 11/1978 |
| WO | 84/00120 A1 | 1/1984 |
| WO | 87/01418 | 3/1987 |
| WO | 91/11273 A1 | 8/1991 |
| WO | 99-27262 A1 | 6/1999 |
| WO | 00/28221 A2 | 5/2000 |
| WO | 02/059489 A1 | 8/2002 |
| WO | 2006/026413 A1 | 3/2006 |
| WO | 2006/132936 A1 | 12/2006 |
| WO | 2007/082077 A1 | 7/2007 |
| WO | 2007/121932 A1 | 11/2007 |
| WO | 2008/144440 A2 | 11/2008 |
| WO | 2009/052325 A1 | 4/2009 |
| WO | 2009/111745 A2 | 9/2009 |
| WO | 2007/009442 A2 | 1/2010 |
| WO | 2010/118366 A1 | 10/2010 |
| WO | 2011/084624 A2 | 7/2011 |
| WO | 2012/167136 A2 | 12/2012 |
| WO | 2012/174215 A2 | 12/2012 |
| WO | 2013/116111 A1 | 8/2013 |

OTHER PUBLICATIONS

Merriam Webster's Collegiate Dictionary, Tenth Edition, 1997, p. 154.

* cited by examiner

FTI

| Specimen | Thickness | Width | Max Gross Stress (ksi) | Max Load (lbs) | R | Cycles to initiate crack | Cycles to 0.25 (inches) | Crack length (inches) | Max Net Stress (ksi) | Max Load (lbs) | R | Cycles to break hole | Cycles to reinitiate | Crack length (inches) |
|---|---|---|---|---|---|---|---|---|---|---|---|---|---|---|
| 1 | 0.249 | 3.007 | 25 | 18719 | 0.05 | 38750 | 119712 | 0.29 | 20.5 | 10995 | 0.05 | 580000 | 4000000 | No crack |
| 2 | 0.248 | 3.009 | 25 | 18656 | 0.05 | 36552 | 151195 | 0.285 | 20.5 | 10961 | 0.05 | 250200 | 4000000 | No crack |
| 3 | 0.246 | 3.005 | 25 | 18481 | 0.05 | 108,300 | 202,320 | 0.298 | 20.5 | 10853 | 0.05 | 15,600 | 220,000 | 0.096 |
| 4 | 0.248 | 3.005 | 25 | 18631 | 0.05 | 45,000 | 127,957 | 0.264 | 20.5 | 10941 | 0.05 | 5,868 | 440,000 | 0.149 |
| 5 | 0.245 | 3.002 | 25 | 18387 | 0.05 | 42358 | 122647 | 0.265 | 20.5 | 10793 | 0.05 | 700,000 | 4000000 | No crack |
| 6 | 0.251 | 3.002 | 25 | 18838 | 0.05 | 60,000 | 123,000 | 0.265 | 20.5 | 11058 | 0.05 | 4,165 | 250,000 | 0.14 |
| 7 | 0.247 | 3.005 | 25 | 18556 | 0.05 | 38,000 | 146,000 | 0.262 | 20.5 | 10897 | 0.05 | 210,000 | 4000000 | No crack |

FIG. 10

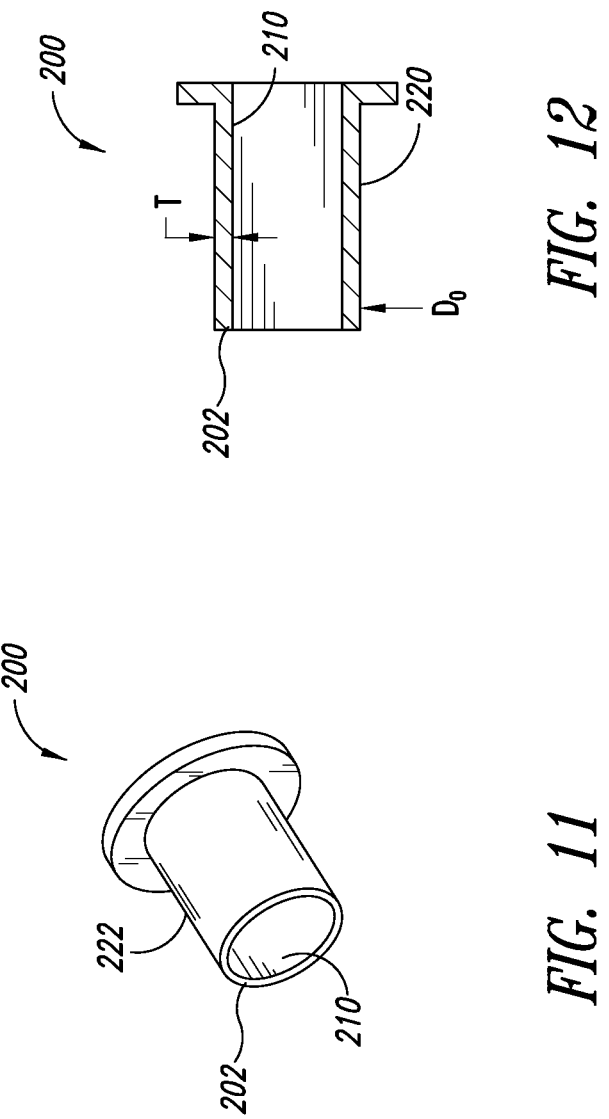

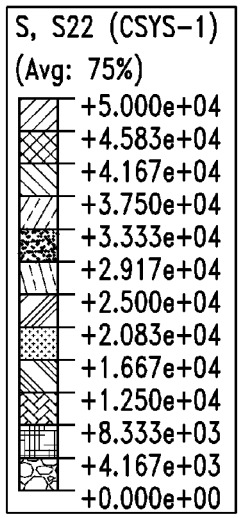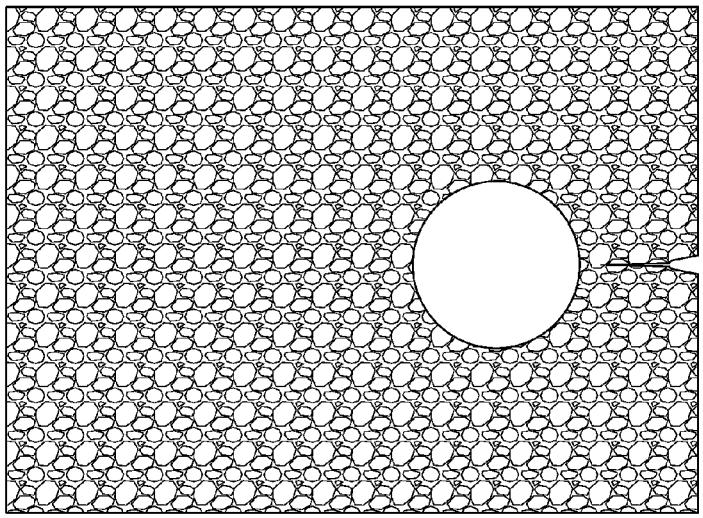
*FIG. 13C* Stop Drill (No Load Applied)
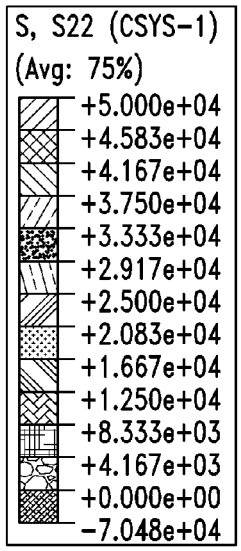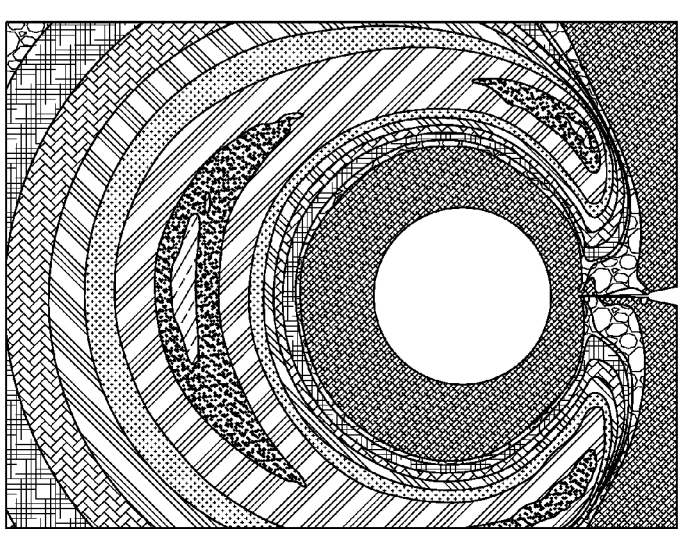
*FIG. 13D* Crack Inhibitor (No Load Applied)

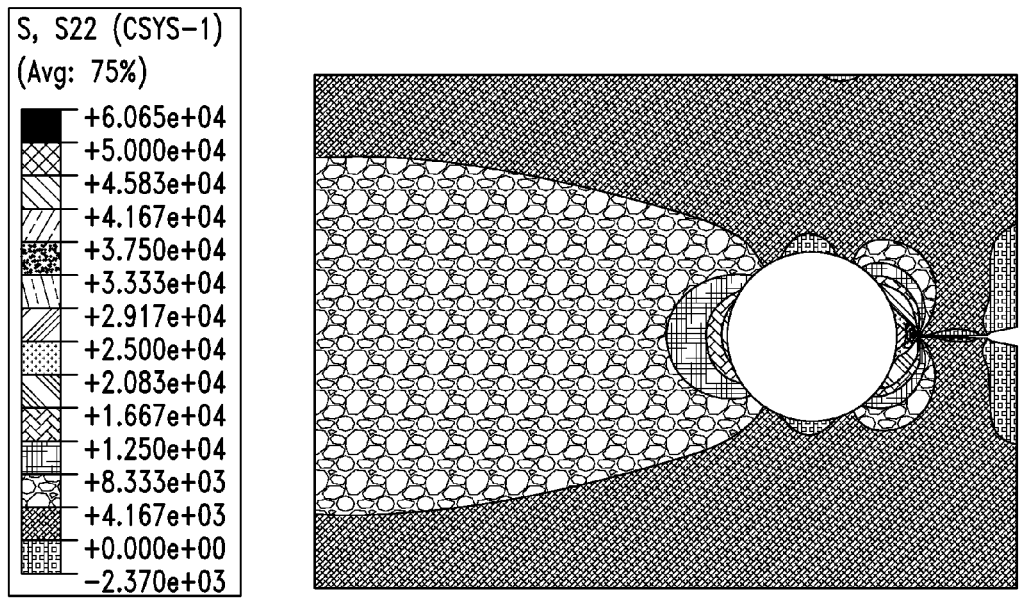
FIG. 13E  Stop Drill  (Tensile Load = 6.76 ksi, net stress)
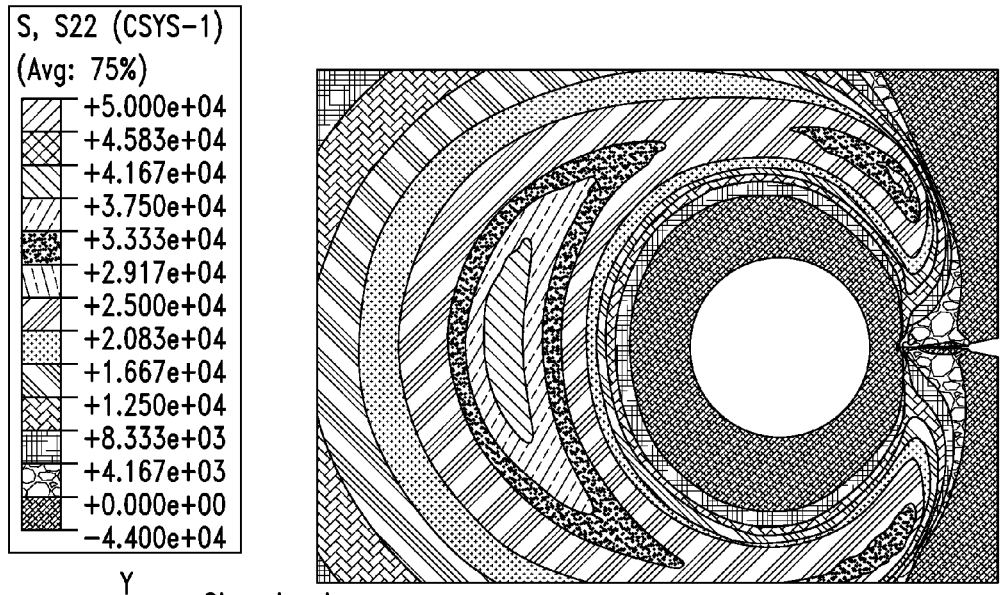
FIG. 13F  Crack Inhibitor  (Tensile Load = 6.76 ksi, net stress)

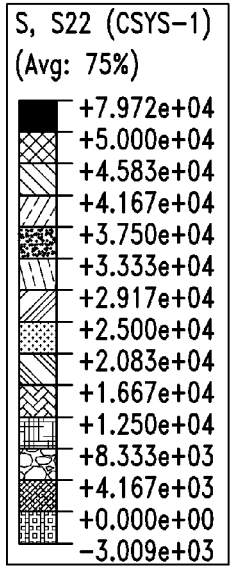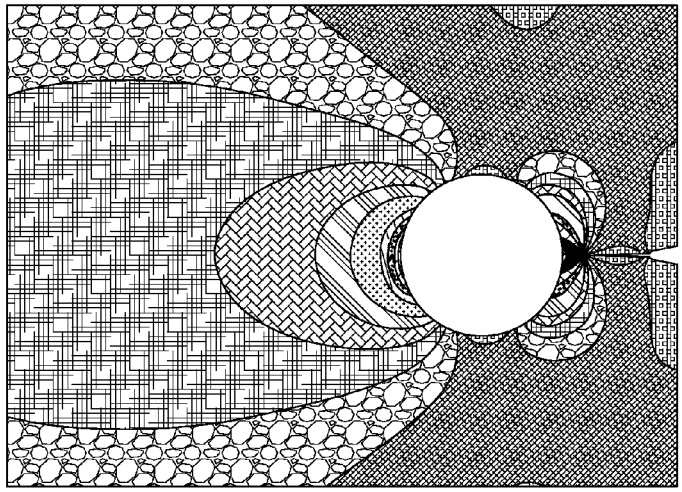
FIG. 13G  Stop Drill    (Tensile Load = 13.5 ksi, net stress)
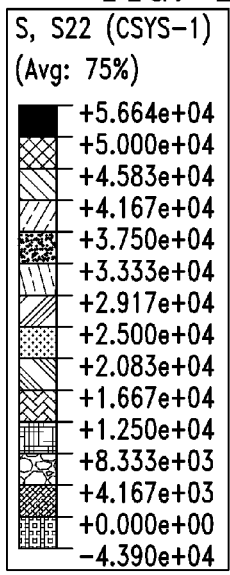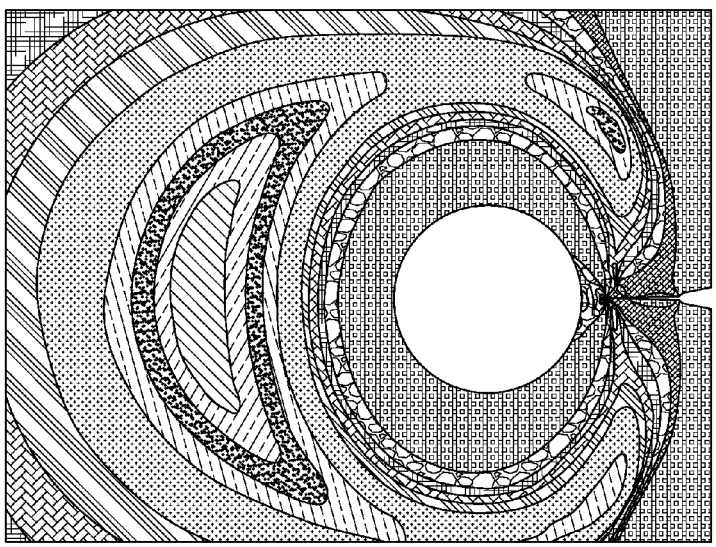
FIG. 13H  Crack Inhibitor  (Tensile Load = 13.5 ksi, net stress)

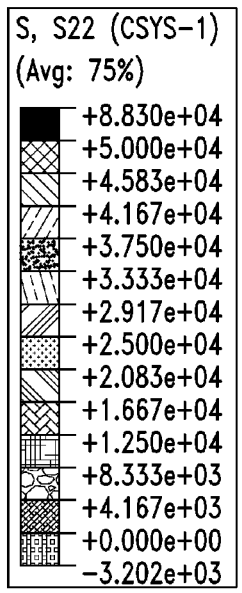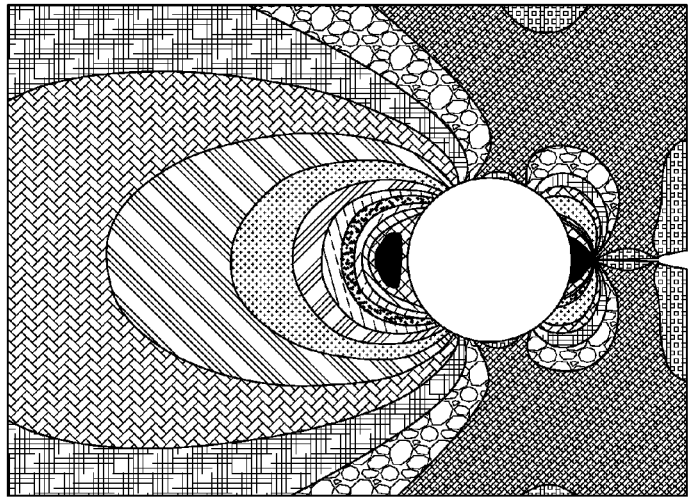
FIG. 13I   Stop Drill   (Tensile Load = 20.5 ksi, net stress)
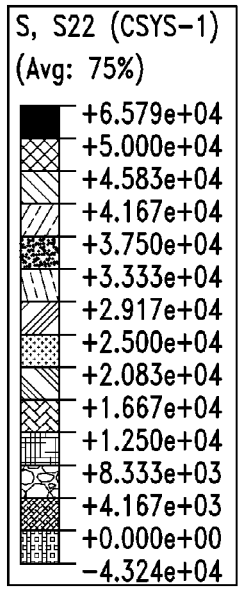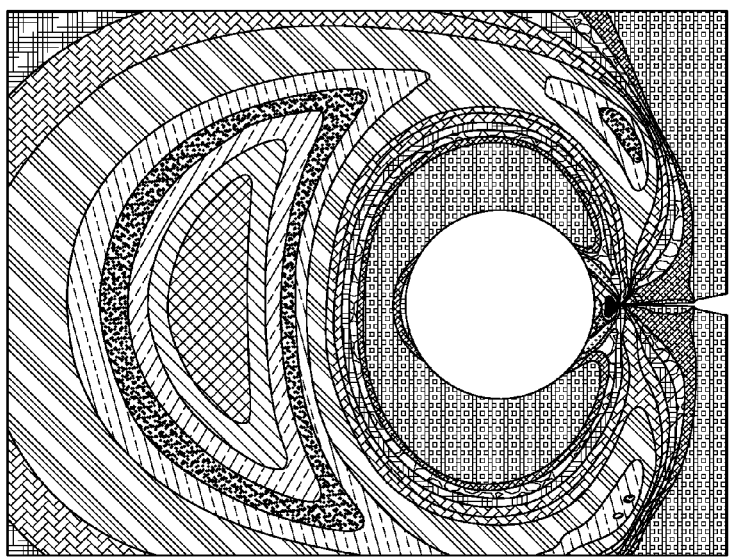
FIG. 13J   Crack Inhibitor   (Tensile Load = 20.5 ksi, net stress)

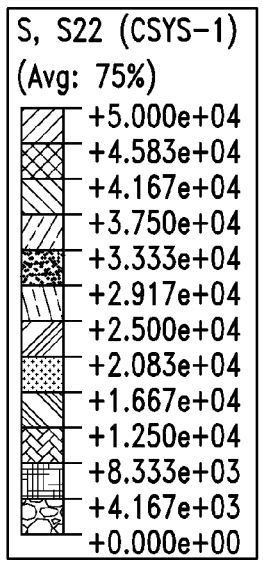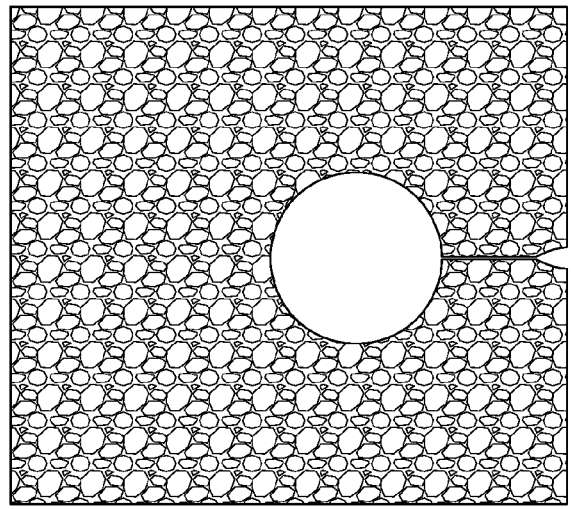
FIG. 14A  Stop Drill  (No Applied Load)
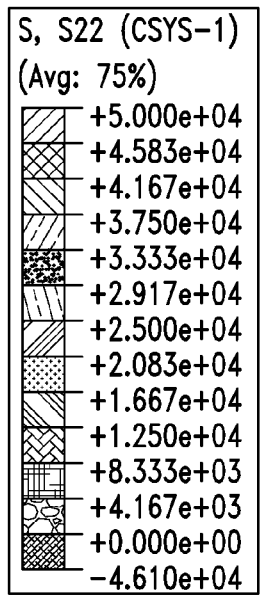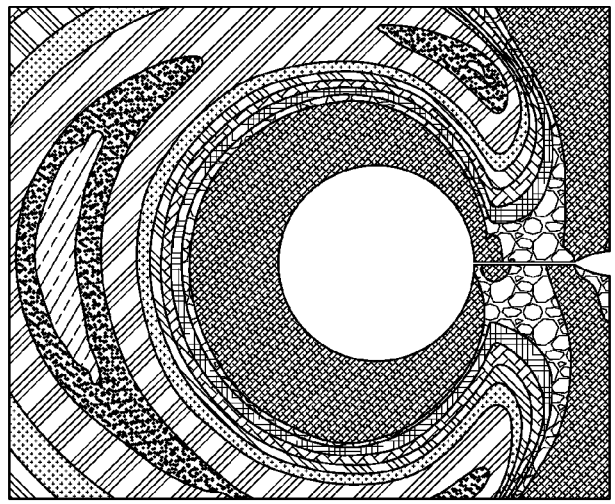
FIG. 14B  Crack Inhibitor  (No Applied Load)

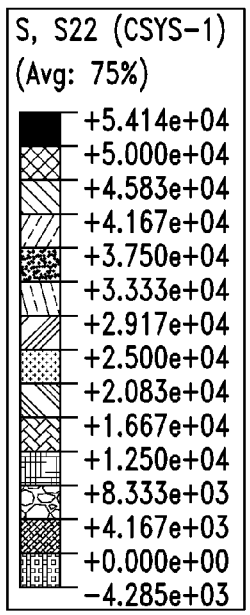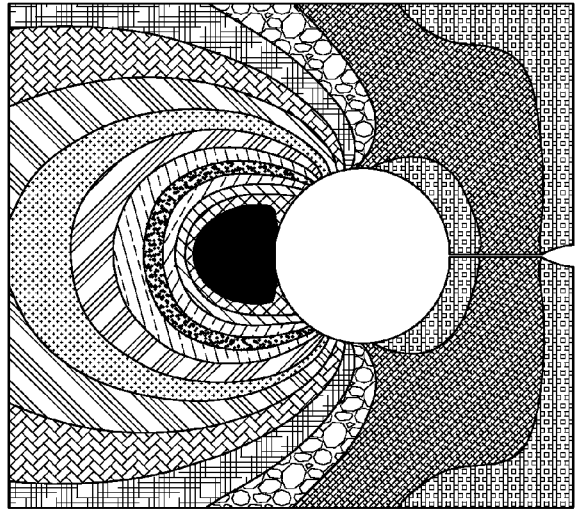
FIG. 14C  Stop Drill     (Tensile Load = 20.5 ksi, net stress)
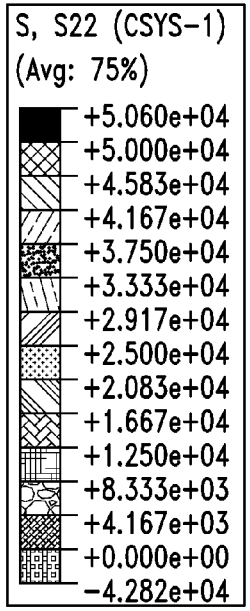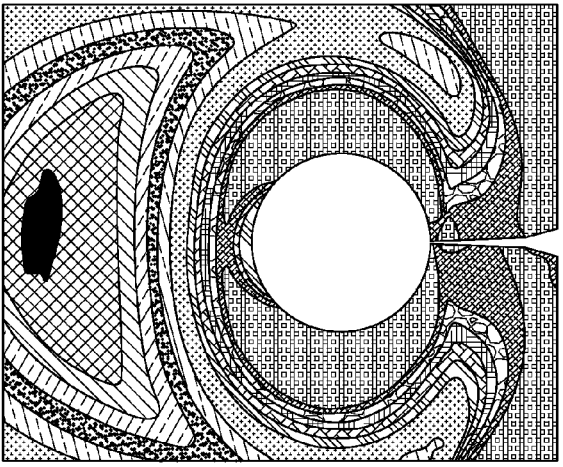
FIG. 14D  Crack Inhibitor   (Tensile Load = 20.5 ksi, net stress)

EXPANDABLE CRACK INHIBITOR METHOD

CROSS-REFERENCE TO RELATED APPLICATION

This application claims the benefit under 35 U.S.C. §119(e) of U.S. Provisional Patent Application No. 61/520,057 filed Jun. 3, 2011, where this provisional application is incorporated herein by reference in its entirety.

BACKGROUND

1. Technical Field

This disclosure generally relates to expandable crack inhibitors and methods of using the same.

2. Description of the Related Art

Structures experiencing cyclic loading often suffer fatigue damage. Bridges are prone to suffer fatigue damage. Fatigue cracks can form and grow over time until ultimate failure of the bridge. Stress risers (e.g., small holes, notches, or other discontinuities) can lead to relatively high stresses in material surrounding the stress risers, even though uniform loads are applied to the structure, resulting in crack initiation. It may be difficult and time consuming to inspect and monitor bridges, buildings, stadiums, trusses, ironworks, vessels (e.g., ships, submarines, barges, or drilling platforms) and other large structures subjected to cyclic loading.

Stop drilling is a technique often used to slow crack growth until repair or rework can be performed. Stop drilling procedures often involve drilling a hole to remove the sharp crack tip, thereby reducing stress concentrations at the end of the crack. This tends to slow crack growth. Unfortunately, stop drilling procedures are typically an interim procedure to delay maintenance because stop drilled cracks typically reinitiate growth.

BRIEF SUMMARY

One or more crack inhibitors can be installed in a workpiece to improve fatigue performance. Crack inhibitors can prevent or retard crack growth to extend the service life of the workpiece. An installation tool with a mandrel can be used to radially expand crack inhibitors to both induce compressive residual stresses and to form interference fits between the crack inhibitors and the workpiece. The installation tool can be separated from the installed crack inhibitors. Crack inhibitors can prop open the workpiece to maintain high levels of compressive stresses.

At least some embodiments are directed to an installation including a workpiece with a crack and a hole in front of the crack tip or origin. A crack inhibitor is installed in the hole. The crack inhibitor maintains compressive residual stresses in the material of the workpiece so as to alter the stresses in the workpiece material surrounding the tip of a crack. In certain embodiments, compressive residual stresses retard crack growth to enhance fatigue performance. The crack inhibitor can be installed in bridges, buildings, vessels, stadiums, and the like. In other embodiments, a crack inhibitor is installed in a non-structural workpiece, such as a part of a transportation vehicle.

The hole can be a non-cold worked hole formed by a machining or drilling process. In other embodiments, the hole can be cold worked to obtain an initial compressive residual stress state. The crack inhibitor can be expanded to alter the initial compressive residual stress state.

The crack can be a visible crack. Crack growth can be arrested for at least about 100,000 cycles, 500,000 cycles, 1,000,000 cycles, or more than about 4,000,000 cycles depending on the level of load applied. The rate of crack growth can be significantly reduced to prolong the service life of the workpiece, reduce the frequency of monitoring, or the like.

In at least some embodiments, a method of processing a workpiece includes forming a hole in front of a crack such that the hole is spaced apart from the tip of the crack. A crack inhibitor is positioned near the hole and is expanded to produce compressive residual stresses in the material of the workpiece surrounding the hole. The compressive residual stresses can be sufficiently high to effect crack re-initiation and/or growth, if any, of the crack.

In at least some embodiments, a method of processing a workpiece includes forming a hole that is spaced apart from a tip of the crack. A crack inhibitor is positioned in the hole. The crack inhibitor is altered to produce stresses in the material of the workpiece surrounding the hole. An installation tool used to install the crack inhibitor is separated from the crack inhibitor which maintains the residual stresses. In certain embodiments, the crack inhibitor can positioned in a general direction of crack propagation (e.g., in front of the crack tip) such that the crack will have to travel through progressively larger residual compressive stresses to grow.

In other embodiments, a kit for processing a workpiece includes a crack inhibitor and a set of instructions for processing the workpiece with the crack inhibitor. The instructions can include any of the methods described herein. For example, the instructions can include forming a hole in front of a crack such that the hole is spaced apart from a tip of the crack, positioning the crack inhibitor in the hole, expanding the crack inhibitor using an installation tool to produce compressive residual stresses in the material of the workpiece surrounding the hole, and separating the installation tool from the expanded crack inhibitor which maintains the compressive residual stresses to effect growth of the crack.

A workpiece can include a part of a transportation vehicle (e.g., an aircraft, an automobile, a train, a boat, a ship, and the like), drilling platform, truss, a structural member (e.g., part of a bridge, building, stadiums, and the like). Bridges include, without limitation, suspension bridges, beam bridges, truss bridges, or rigid frame, arch bridge, girder bridge, or other structure spanning a river, chasm, road, or the like. In some embodiments, crack inhibitors are installed in multi-piece joints to help prevent movement between joint components. In other embodiments, crack inhibitors are installed in a single component (e.g., a plate).

BRIEF DESCRIPTION OF THE SEVERAL VIEWS OF THE DRAWINGS

FIG. 10 is a table showing testing data.

FIG. 11 is an isometric view of a crack inhibitor, according to one illustrated embodiment.

FIG. 12 is a longitudinal cross-sectional view of the crack inhibitor of FIG. 11.

FIG. 13C shows hoop stresses of the stop drilled plate with no applied load.

FIG. 13D shows hoop stresses of the plate with the crack inhibitor without an applied load.

FIG. 13E shows hoop stresses of the stop drilled plate with a tensile load resulting in a net stress of 6.76 ksi.

FIG. 13F shows hoop stresses of the plate with the crack inhibitor with a tensile load resulting in a net stress of 6.76 ksi.

FIG. 13G shows hoop stresses of the stop drilled plate with a tensile load resulting in a net stress of 13.5 ksi.

FIG. 13H shows hoop stresses of the plate with the crack inhibitor with a tensile load resulting in a net stress of 13.5 ksi.

FIG. 13I shows hoop stresses of the stop drilled plate with a tensile load resulting in a net stress of 20.5 ksi.

FIG. 13J shows hoop stresses of the plate with the crack inhibitor with a tensile load resulting in a net stress of 20.5 ksi.

FIG. 14A shows hoop stresses of the stop drilled plate with no applied load.

FIG. 14B shows hoop stresses of the plate with the crack inhibitor with no applied load.

FIG. 14C shows hoop stresses of the stop drilled plate with a tensile load resulting in a net stress of 20.5 ksi.

FIG. 14D shows hoop stresses of the plate with the crack inhibitor with a tensile load resulting in a net stress of 20.5 ksi.

DETAILED DESCRIPTION

In the following description, certain specific details are set forth in order to provide a thorough understanding of various disclosed embodiments. One skilled in the art will understand that the disclosed embodiments may be practiced without these details. The terms "proximal" and "distal" are used to describe the illustrated embodiments and are used consistently with the description of non-limiting exemplary applications. The terms proximal and distal are used in reference to the user's body when the user operates an installation tool, unless the context clearly indicates otherwise.

Generally, a crack inhibitor can be installed in a workpiece to enhance fatigue performance by introducing stress states to inhibit crack formation or initiation, retard crack propagation, or otherwise effect crack growth to enhance fatigue performance. Crack inhibitors can be installed at locations proximate to stress risers to inhibit or prevent crack initiation. To manage already formed cracks, crack inhibitors can be installed to arrest or retard crack growth. Crack inhibitors can be installed in a wide range of different types of holes, including cold-worked holes and non-cold worked holes (i.e., holes that have not been cold worked to induce appreciable residual stresses) using, for example, an expansion mandrel. Additionally, a single process can be used to both cold work the workpiece and install the crack inhibitor.

Figure 1:
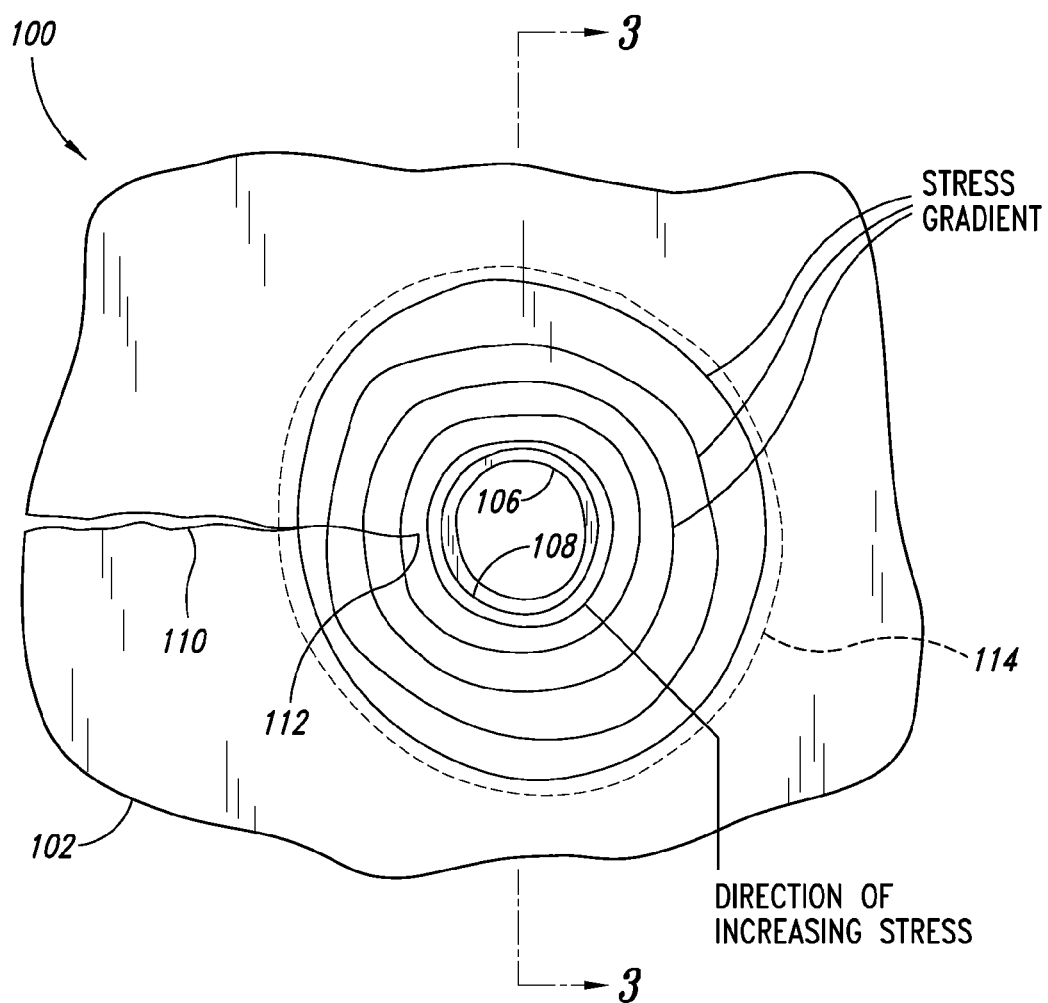
FIG. 1 is a front elevational view of an installation with a crack inhibitor installed in a structural workpiece.

FIG. 1 shows an installation 100 including a workpiece 102 and a crack inhibitor 106 positioned in a hole 108. The crack inhibitor 106 is positioned in front of a crack 110 and maintains compressive residual stresses to help manage stresses around a crack tip 112. The compressive residual stresses are greatest adjacent the surface of the hole 108 and decrease away from the hole 108. The crack inhibitor 106 is positioned in a general direction of crack propagation such that the crack 110 will have to travel through progressively larger residual compressive stresses to grow. The crack inhibitor 106 can prop open the hole 108 so as to maintain sufficiently high residual compressive stresses in the workpiece 102 to arrest crack growth, retard crack propagation, or otherwise enhance fatigue performance.

A crack inhibiting zone 114 (represented by a dashed line) defined by residual stresses extends across at least most of a distance between the hole 108 and the crack tip 112. This ensures that residual stresses help counter balance high localized stresses around the crack tip 112. Various types of expansion processes can be employed to install the crack inhibitor 106. In a cold expansion process, for example, expandable crack inhibitors are radially expanded without appreciably raising their temperatures to produce residual stresses in the workpiece and/or crack inhibitor. Other types of installation processes can also be used to install crack inhibitors.

Figure 2:
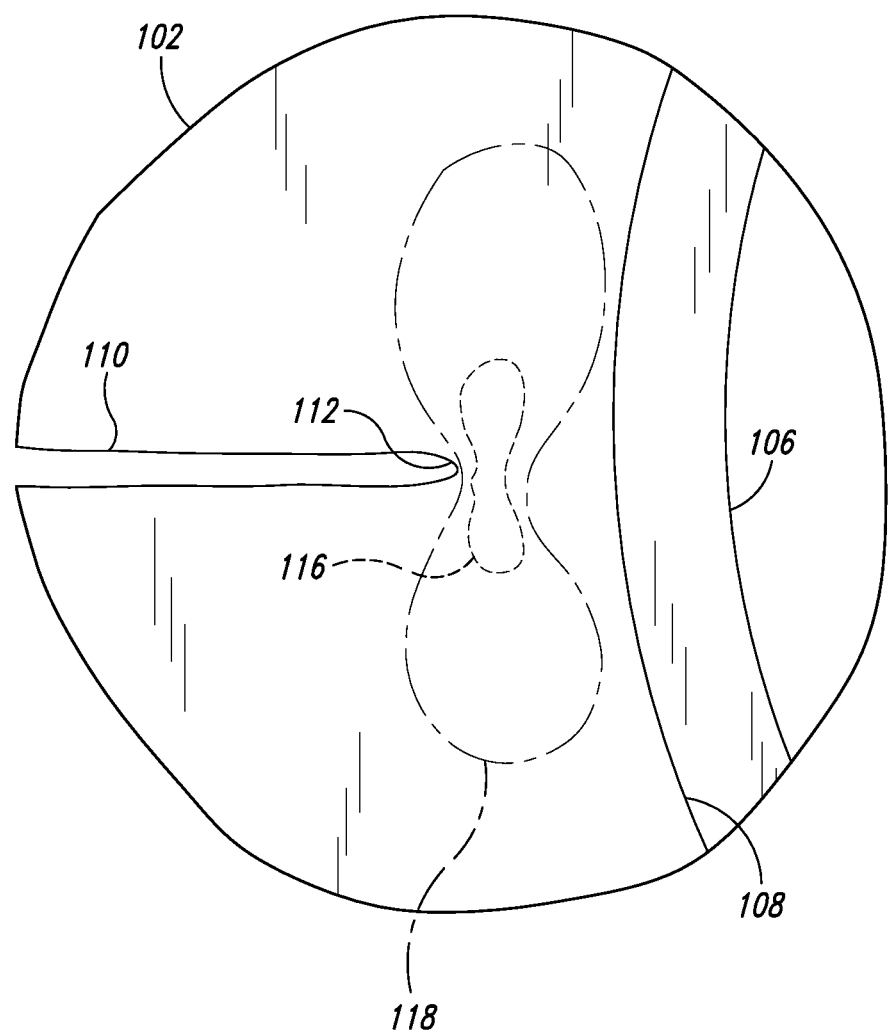
FIG. 2 is a detailed view of a crack tip.
Figure 3:
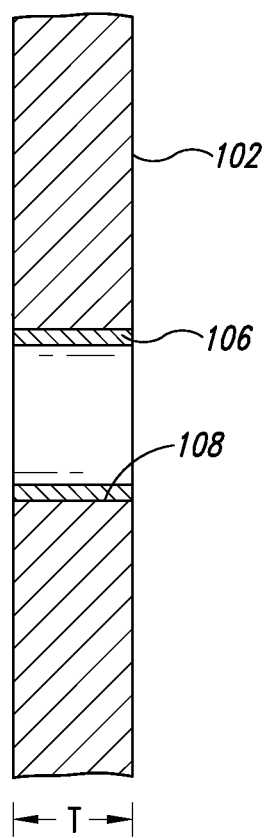
FIG. 3 is a cross-sectional view of the installation of FIG. 1 taken along a line 3-3.

FIG. 2 shows a plastic zone 116 at the crack tip 112. The plastic zone 116 is smaller than a theoretical plastic zone 118. The theoretical plastic zone 118 is the plastic zone that would be present without the induced residual stresses. The size of the plastic zone 116 can be increased or decreased by increasing or decreasing the compressive residual stresses, which can be generally uniform across a thickness T of the workpiece 102 (see FIG. 3).

The crack inhibitor 106 can include, but is not limited to, a tubular member (illustrated in FIG. 3), a bushing (including a one-piece bushing or a multi-piece bushing), or other structural expandable member that can be incorporated into a workpiece. Tubular members can have circular cross-sectional profiles, elliptical cross-sectional profiles, or the like. A crack inhibitor can be expanded from an initial configuration to an expanded configuration. In some embodiments, for example, crack inhibitor 106 is a thick-walled bushing. Crack inhibitors can be suitable for blind side installations. For example, a mandrel (e.g., a tapered mandrel) or an installation tool with an expandable nose cap can radailly expand crack inhibitors into workpiece. U.S. patent application Ser. No. 12/399,817 (U.S. Patent Publication No. 2010/0000280); U.S. Pat. No. 7,375,277; U.S. patent application Ser. No. 11/588,828 (U.S. Patent Publication No. 2007/0110541); U.S. patent application Ser. No. 10/928,641, granted as U.S. Pat. No. 8,057,144; U.S. patent application Ser. No. 11/653,196 (abandoned); U.S. patent application Ser. No. 12/253,141, granted as U.S. Pat. No. 8,312,606; U.S. patent application Ser. No. 12/757,860, granted as U.S. Pat. No. 8,636,455; and U.S. patent application Ser. No. 12/158,943 (U.S. Patent Publication No. 2009/0304315), granted as U.S. Pat. No. 8,568,034 disclose different types of installable members that can be used as crack inhibitors. Crack inhibitors can be one-piece tubular members with seamless outer surfaces. In multi-piece embodiments, crack inhibitors can have an outer member and an inner member. For example, a crack inhibitor can include an outer tubular member through which a stud or other solid member is installed (see FIGS. 15 and 15A). U.S. patent application Ser. No. 12/757,860, granted as U.S. Pat. No. 8,636,455 and Ser. No. 12/253,141, granted as U.S. Pat.

No. 8,312,606 disclose multi-piece fasteners and bushings that can be crack inhibitors. Each of the patent applications and patents is incorporated by reference in its entirety. It is noted that the term "expandable crack inhibitor" refers to a crack inhibitor in a pre-expanded state and a post-expanded state, unless the context clearly dictates otherwise. Crack inhibitors can be made, in whole or in part, of steel (including stainless steels), bronze, brass, aluminum, aluminum-nickel-bronze, copper beryllium, or the like.

The workpiece 102 can be a parent structure having at least one hole suitable for processing (e.g., receiving an expandable crack inhibitor, undergoing cold expansion, etc.). The hole can be, for example, a through-hole, a blind hole, a counterbore hole, or other type of circular or elliptical hole that may or may not have backside access. A structural workpiece can be a rail, a bridge, a structural member (e.g., a structural load bearing member of a building), or the like. In non-limiting exemplary embodiments, the workpiece 102 is a beam or a column of a bridge. Bridge beams often span two supports and can bear significant loads and, thus, may be susceptible to fatigue damage. Crack inhibitors can be installed at various locations along these types of load bearing components. In buildings, crack inhibitors can be installed in beams, columns, or other load bearing components. During construction of stationary structures (e.g., buildings, bridges, stadium, or the like), crack inhibitors can be installed to manage stresses. By way of example, crack inhibitors can be installed near stress risers to prevent crack initiation and, if cracks form, to retard crack growth. Crack inhibitors can also be installed in non-structural workpieces including, but not limited to, transportation vehicles.

Figure 4:
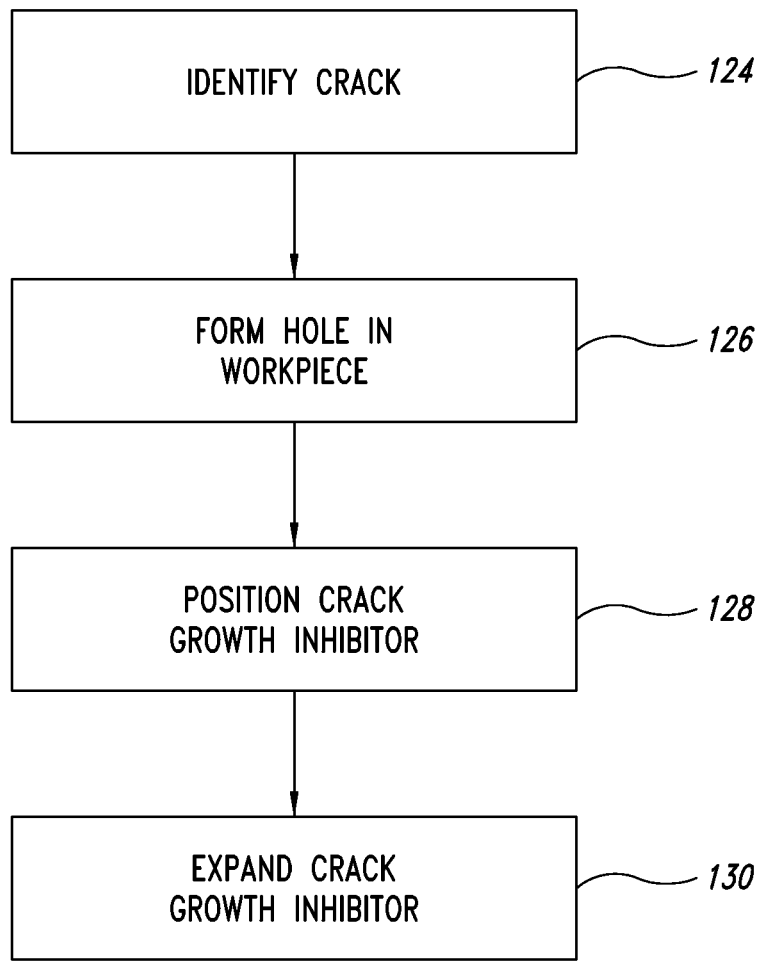
FIG. 4 is a flow chart for installing a crack inhibitor.

FIG. 4 is a flow chart for installing a crack inhibitor. Generally, a crack is identified. A hole is formed in the workpiece near a tip of the crack. A crack inhibitor is positioned in the hole and radially expanded to produce stresses in the material of the workpiece surrounding the hole. The crack inhibitor is left in the workpiece to ensure that desired residual stresses are maintained. This installation process is detailed below.

At 124, a crack can be identified visually with the naked eye. To identify cracks not readily seen with the naked eye, an optical aid (e.g., a magnifying device, a microscope, or other crack optical monitoring equipment), ultrasound equipment, and mechanical or electromechanical equipment (e.g., a ball deformer, a caliper gauge, or a crack monitoring sensor) can be used to locate and monitor cracks of different sizes.

Figure 5:
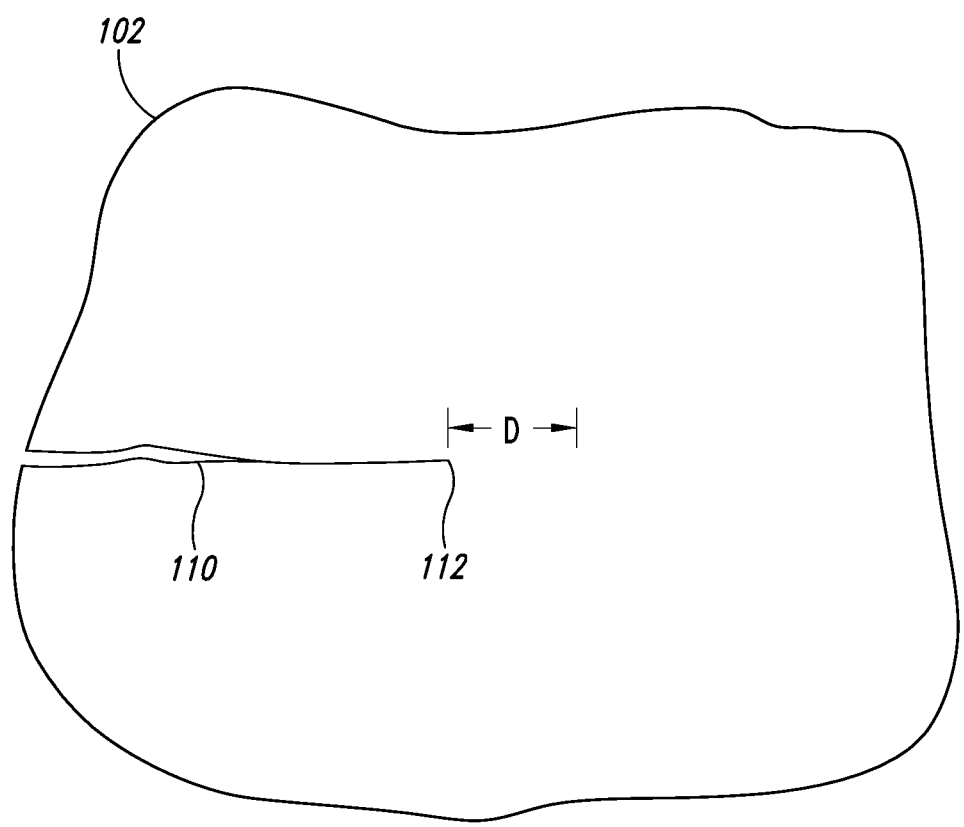
FIG. 5 is a front elevational view of a workpiece with a crack.

At 126, a hole is formed in the workpiece. As shown in FIG. 5, a distance D can be measured to locate the center of the hole at a desired distance in front of the crack 110. In some embodiments, distance D is measure in a direction of the path along which the crack 110 tends to travel and, in some embodiments, can be less than about 0.1 inch. Other distances D are also possible and can be selected to prevent excessive stresses during installation, which could further open the crack 110. The distance D can be sufficiently small to ensure that the induced stresses affect the stresses at the crack tip.

Figure 6:
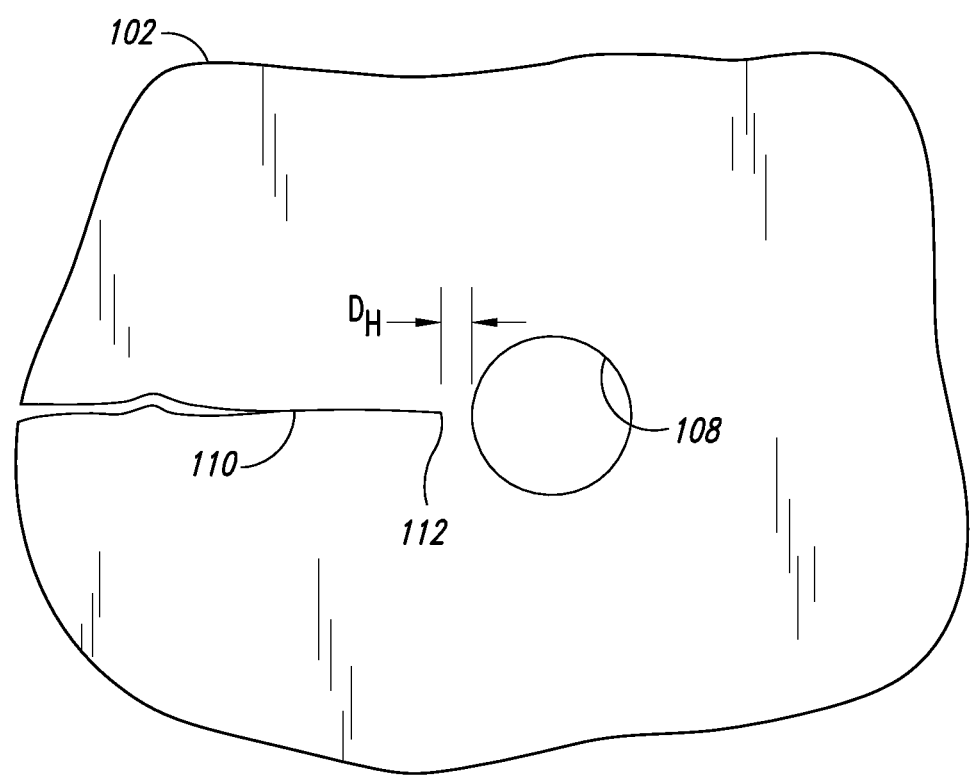
FIG. 6 is a front elevational view of the workpiece of FIG. 5 with a hole in front of the crack.

FIG. 6 shows a hole 108 that can be formed by a drilling process. The edge of the hole 108 is spaced apart from the crack tip 112 a distance $D_H$. The diameter of the hole 108 can be selected such that the minimum distance $D_H$ can be equal to or less than about 0.07 inch, if the workpiece 102 is made of structural steel, such as A36 steel. The hole diameter can be about 0.1 inches, 0.25 inches, 0.5 inches, 0.75 inches, or 1 inch. Other diameters can be selected based on the material properties of the workpiece, configuration and size of the crack, desired induced stress state, environmental conditions (e.g., corrosive substances, lightening strikes, etc.), or the like.

At 128 of FIG. 4, crack inhibitor 106 is inserted into the hole 108 immediately after forming the hole 108. Accordingly, the hole 108 can be a non-cold worked hole. In alternative embodiments, the hole 108 can be cold worked prior to installing the crack inhibitor 106. For example, a mandrel can be drawn through the hole 108 to induce low compressive stresses in the workpiece.

Figure 7:
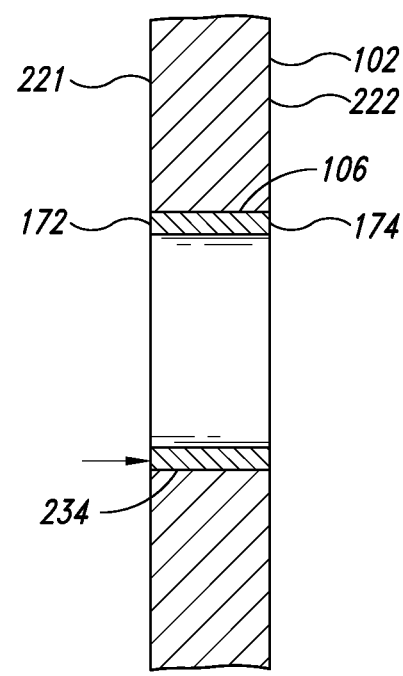
FIG. 7 is a cross-sectional view of an unexpanded crack inhibitor positioned in a hole of a workpiece.

FIG. 7 shows an unexpanded crack inhibitor 106 positioned in the hole 108. A longitudinal length of the crack inhibitor 106 can be approximately equal to a longitudinal length of the hole 108. A first end 172 of the crack inhibitor 106 can be generally flush with or slightly offset from a first side 221 of the workpiece 102. The second end 174 of the crack inhibitor 106 can be generally flush with or slightly offset from a second side 222 of the workpiece 102.

At 130 of FIG. 4, the crack inhibitor 106 is expanded. The expansion mandrel 120 of FIG. 8 can be inserted into and through the crack inhibitor 106 and coupled to an installation tool 154. A clearance fit can be provided between an outer surface 234 of the crack inhibitor 106 and the inner surface 230 of the hole 108 to allow convenient repositioning of the crack inhibitor 106.

Figure 8:
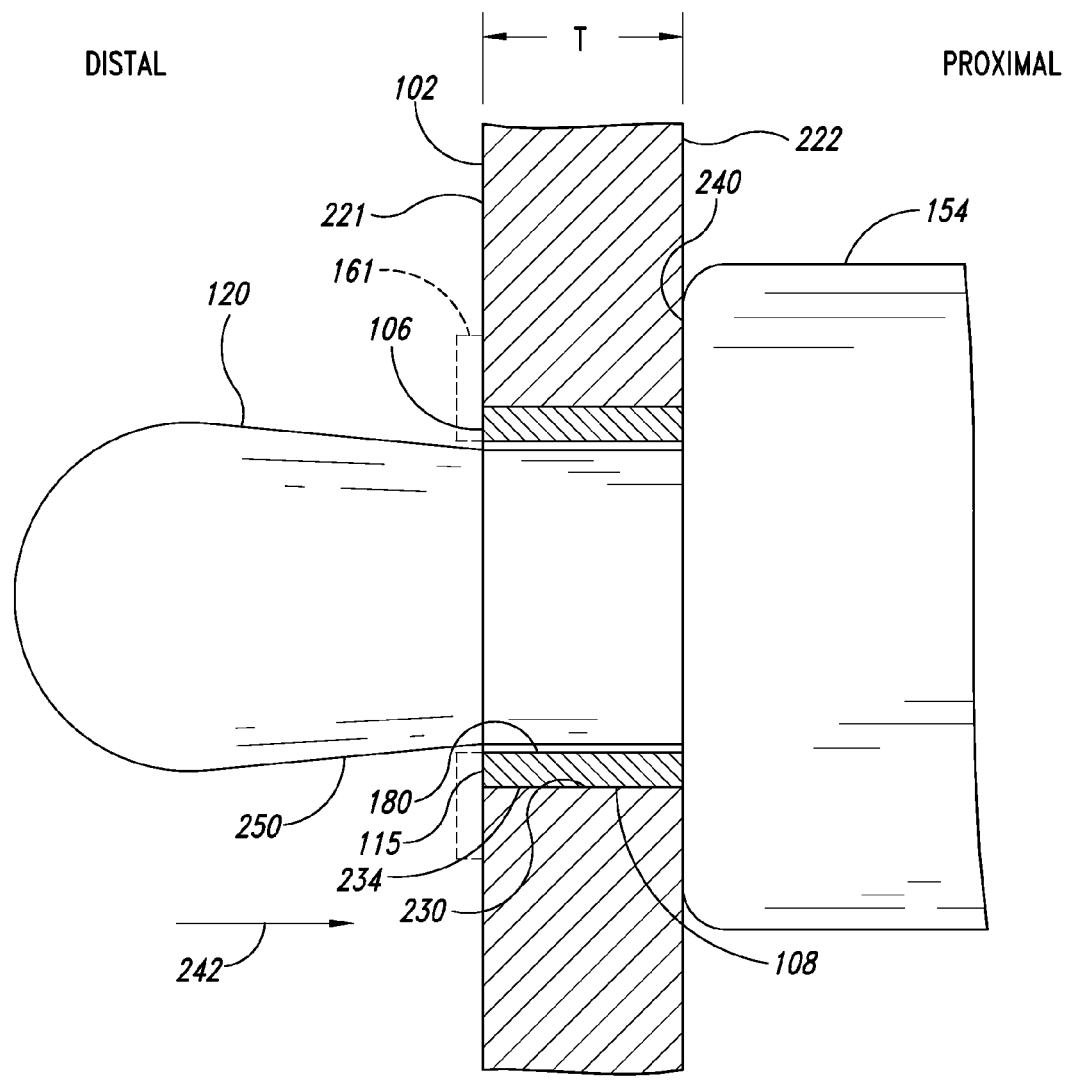
FIG. 8 is a cross-sectional view of an installation with a mandrel positioned in a crack inhibitor before the crack inhibitor has been radially expanded, according to one illustrated embodiment.

FIG. 8 shows the mandrel 120 configured to radially expand the crack inhibitor 106 when an expansion section 250 (e.g., a tapered section) is moved axially through a passageway 180. As used herein, the term "mandrel" is a broad term and includes, but is not limited to, an elongated component having at least one tapered portion or expansion portion used to expand a member. In some embodiments, the expansion portion is a gradually tapered portion. Mandrels can have a one-piece or multi-piece construction. In one-piece embodiments, a mandrel can have a monolithically formed body. In multi-piece embodiments, the mandrel can be a split mandrel.

A proximal or front surface 240 of the installation tool 154 bears against the second side 222 of the workpiece 102. The installation tool 154 pulls the mandrel 120 proximally, as indicated by the arrow 242, such that the expansion section 250 radially expands the entry side of the crack inhibitor 106 into the workpiece 120. A reaction to the pulling force moves the installation tool 154 forwardly to keep its forward surface 240 into tight contact with the workpiece 102. As the crack inhibitor 106 expands, it makes a tight interference fit with the sidewall of hole 108.

If a side wall 115 of the crack inhibitor 106 is radially and circumferentially expanded sufficiently to exceed the yield point of the material of the side wall 115, side wall 115 becomes permanently enlarged radially and circumferentially so that the elastically enlarged portion of the material of the workpiece 102 about the hole 108 is forced inwardly on the side wall 115. This produces a radially oriented compressive stress gradient within the side wall 115. The hoop strength of the side wall 115 can be sufficient to maintain a radially oriented compressive stress gradient in the workpiece material immediately adjacent the hole 108 when the crack inhibitor 106 is left in hole 108. If the material of the crack inhibitor 106 has less rebound than that of workpiece 102, then the crack inhibitor 106 props open the hole 108, thereby sizing the hole 108. If the crack inhibitor 106 is removed (e.g., removed for rework or maintenance), the amount of rebound of the material in the workpiece 102 depends on the amount of plastic and elastic deformation caused by the installation process.

The radially oriented compressive stress gradient induced by the crack inhibitor 106 can be cumulative with the radially oriented compressive stress gradient induced by the elastically enlarged portion of the material of the workpiece 102.

Even if the radially oriented tensile stress gradient induced in the permanently enlarged portion of the workpiece 102 is not completely overcome when the elastically enlarged portion forces inwardly on the permanently enlarged portion, a compressive stress gradient is ensured throughout this permanently enlarged portion of the workpiece 102 due to the outwardly directed radial force exerted on the permanently enlarged crack inhibitor 106 because of its hoop strength. The compressive stress gradient can be generally uniform both about 360 degrees of the circumference of the hole 108 and the entire length of the hole 108.

The illustrated crack inhibitor 106 is flangeless. In other embodiments, a flange 161 (illustrated in phantom in FIG. 8) limits movement along the hole 108. The mandrel 120 can pull the flange 161 tight against the surface 221. The crack inhibitors can also be sealable. If crack inhibitors are installed in vessels (e.g., ships), the crack inhibitors can form sealed installations.

Figure 9:
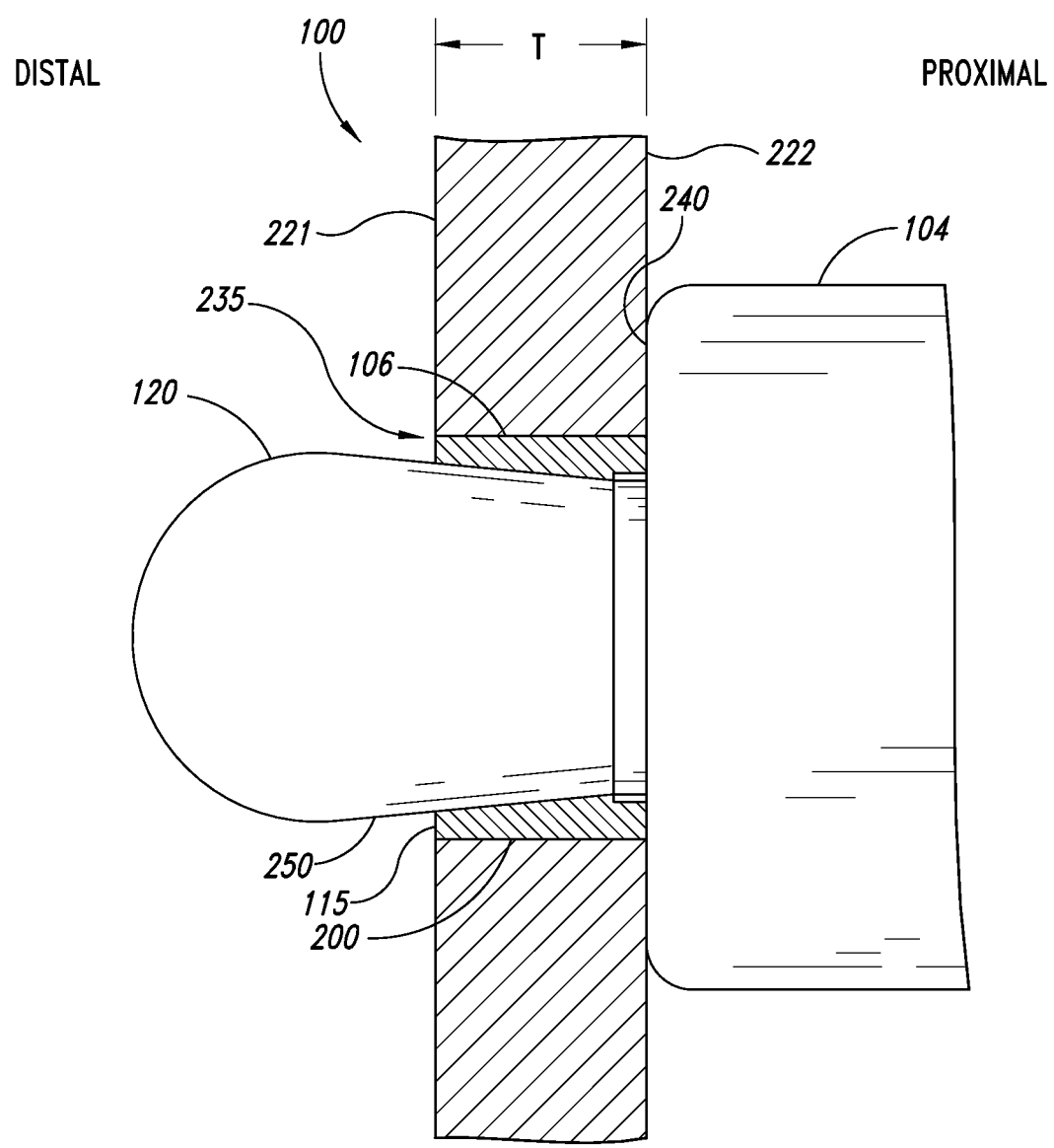
FIG. 9 is a cross-sectional view of the installation of FIG. 8 with the mandrel radially expanding a portion of the crack inhibitor, according to one illustrated embodiment.

Referring to FIG. 9, tapered portion 250 moves through and exits the crack inhibitor 106. A tight interference fit can be produced along the entire length of the crack inhibitor 106. The mandrel 120 is pulled out of the crack inhibitor 106 to allow separation of the installation tool 154 from the installation 100. The mandrel 120 can be used to install any number of additional crack inhibitors. Different types of installation tools (e.g., hydraulic installation tools, pneumatic installation tools, and electronically driven installation tools) can be used to install crack inhibitors.

Crack inhibitors can significantly increase the number of cycles to reinitiate cracks and can also retard crack growth as compared to conventional stop drilling. FIG. 10 includes data generated analyzing specimens that were plates prenotched along one edge to develop a desired length crack. Test specimens were made of A36 steel and had a length of about 18 inches, a width of about 3 inches, and a thickness of about 0.25 inch. A 0.06 to 0.07 inch flaw was machined into an edge of the specimen with a 0.03 inch radius. The specimens were precracked by applying a load such that a crack extended from the machined notch. Crack lengths were monitored periodically by stopping the test and visually observing the crack using an optical microscope. Specimens were subjected to a net stress, based on the area of the notch, of 25 ksi with a stress ratio about +0.5. The edge of holes machined into specimens were approximately 0.065 inch from the crack tip. The holes had a diameter of about 0.5 inch.

Specimens 1, 2, 5, and 7 are specimens in which crack inhibitors were installed, and specimens 3, 4, and 6 were stop drilled. The crack inhibitors were from Fatigue Technology, Inc. Cyclic loads (e.g., 38,750 cycles to initiate a crack in specimen 1) were applied to the specimen to pre-crack the specimen. As shown in FIG. 10, the number of cycles to reinitiate cracks is significantly greater for the crack inhibitor installations. For example, specimen 1 shows that more than 4,000,000 cycles are needed to reinitiate cracks, as compared to 220,000-440,000 to reinitiate cracks in stop drilled specimens. Crack growth rates can, thus, be substantially reduced. Indeed, specimens with crack inhibitors experience no crack reinitiation and no crack growth.

FIGS. 11 and 12 show a crack inhibitor 200 in accordance with one embodiment. A side wall 202 has a substantially constant wall thickness T and is defined by substantially concentric inner and outer surfaces 210 and 220. The side wall 202 can be radially and circumferentially expanded to cold work the material of the workpiece, but the column strength of the side wall 202 can be sufficient to prevent an appreciable amount of axial movement of the side wall 202 as it is expanded. The material and dimensions of side wall 202 can be selected such that the amount of rebound or recovery of the side wall 202 is substantially less than the material of the workpieces upon radial and circumferential enlargement of the side wall 202 beyond its yield point or elastic limit. Thus, the amount of rebound of the workpiece about a hole can be controlled.

If a workpiece comprises steel (e.g., A36 steel), the sidewall thickness T can be in a range of about $\frac{1}{32}$ inch to about $\frac{1}{16}$ inch and can be made, in whole or in part, of metal (e.g., steel, aluminum, etc.). An outer diameter $D_O$ prior to expansion can be slightly less than about 0.5 inch if the crack inhibitor 200 is installed in a hole having a diameter of about 0.5 inch. The diameter D of the crack inhibitor 200 can be selected based on the dimensions of the hole and the desire fit (e.g., a clearance fit).

Figure 13A:
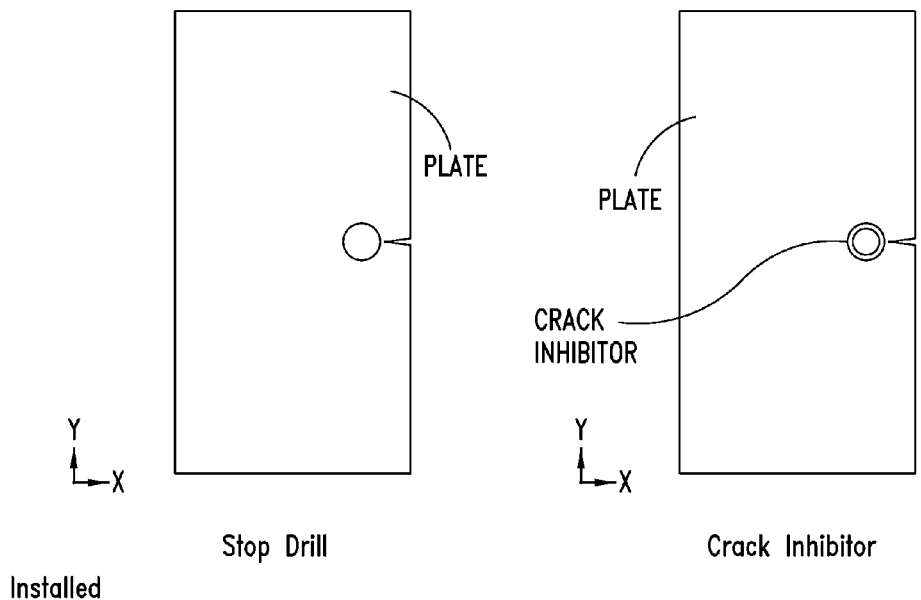
FIG. 13A shows computer generated models of a stop drilled plate and a plate in which a crack inhibitor is installed.
Figure 13B:
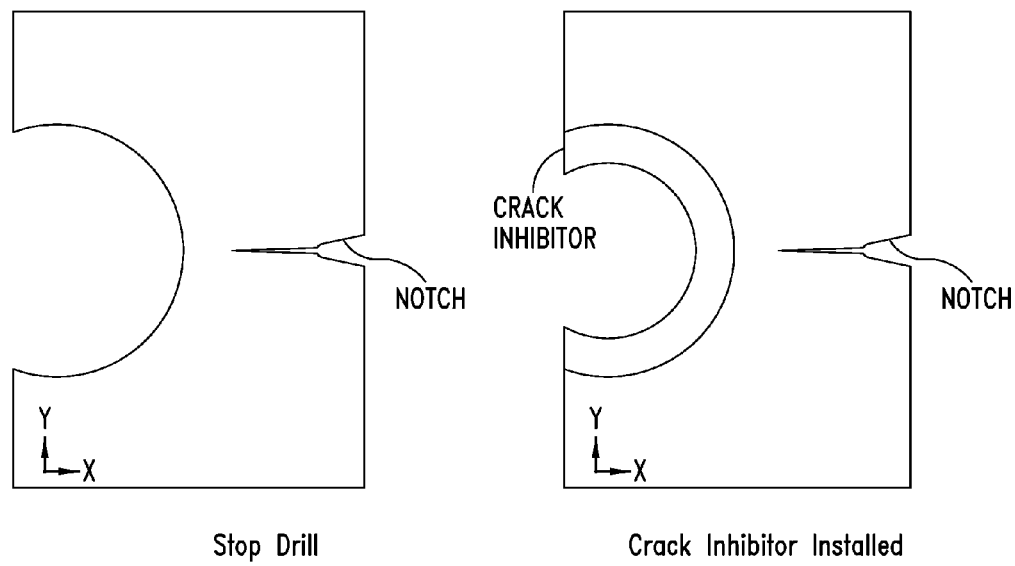
FIG. 13B shows portions of meshed models of FIG. 13A.

FIGS. 13A and 13B shows computer generated models of a plate with a stop drill hole and another plate in which a crack inhibitor is installed. FIG. 13B shows the meshed models. The holes have diameters of about 0.5 inch, are located about 0.603 inch from the nearest plate edges, and are about $\frac{1}{16}$ of an inch in front of the crack tip. Each notch has a length of 0.074 inch and a width of 0.06 inch and plates have a width of about 3 inches. The material of the plate material was A36 steel with a yield strength of 46.6 ksi and an ultimate strength of 70.1 ksi. These models were analyzed using finite element analysis (FEA) software. The cracks were not allowed to grow due to the applied stresses. A tensile load of 10,995 pounds (net stress equals 20.5 ksi) was applied to the plates to evaluate stresses around the crack tip.

FIG. 13C shows the hoop stresses (psi) of the stop drilled plate when no load is applied. FIG. 13D shows the hoop stresses (psi) of the installation with the crack inhibitor when no load is applied. Compressive stresses are maintained in the material surrounding the crack inhibitor.

FIGS. 13E and 13F show the stop drill plate and crack inhibitor installation, respectively, when a tensile load is applied resulting in net stress on the plates of 6.76 ksi. A comparison of the stresses shows that high stresses at the crack tip are minimized. In FIG. 13E, the material of the workpiece immediately in front of the crack tip experiences plastic deformation. In contrast, the stresses of the crack tip shown in FIG. 13F are well below the yield strength of the material.

FIGS. 13G and 13H show the stop drilled plate and crack inhibitor installation, respectively, when a tensile load is applied resulting in a stress on the plates of 13.5 ksi. In FIG. 13G, a significant portion of the material in front of the crack tip experiences plastic deformation as compared to substantially no plastic deformation in front of the crack tip of FIG. 13H.

FIGS. 13I and 13J show the stop drilled plate and crack inhibitor installation, respectively, when a tensile load is applied resulting in a stress on the plates of 20.5 ksi. FIG. 13I shows plastic deformation on both sides of the hole. In contrast, FIG. 13J shows that the crack inhibitor significantly reduces the plastic deformation in front of the tip. Additionally, on the side of the hole opposite the crack, the workpiece does not experience any plastic deformation.

FIGS. 14A and 14B show the plates when the cracks run into the bores of the holes when no load is applied. As shown in FIG. 14B, hoop stresses are maintained in the workpiece surrounding the crack.

FIGS. 14C and 14D show a portion of the stop drill plate and the crack inhibitor installation, respectively, with an applied tensile load resulting in a net stress of about 20.5 ksi. A relatively large zone of plastic deformation in FIG. 14C is located on the side of the hole opposing the crack. FIG. 14D shows that the crack inhibitor prevents deformation of the hole because of the compressive stresses. This prevents or inhibits initiation of a crack at the opposing side of the hole.

Crack inhibitors can serve as visual indicators to identify previously processed cracks. If a crack propagates and reaches the bore of the hole, compressive residual stresses can inhibit initiation of a new crack tip, for example, at a side of the bore opposing the crack. Additionally, the tip of the crack may extend generally perpendicular between opposing sides of the workpiece. In other embodiments, the tip of the crack can extend obliquely from a surface (e.g., a proximal or front surface) of the workpiece. Both sides of the workpiece can be inspected to ensure that the crack inhibitor is in front of the entire crack tip front.

Figure 15:
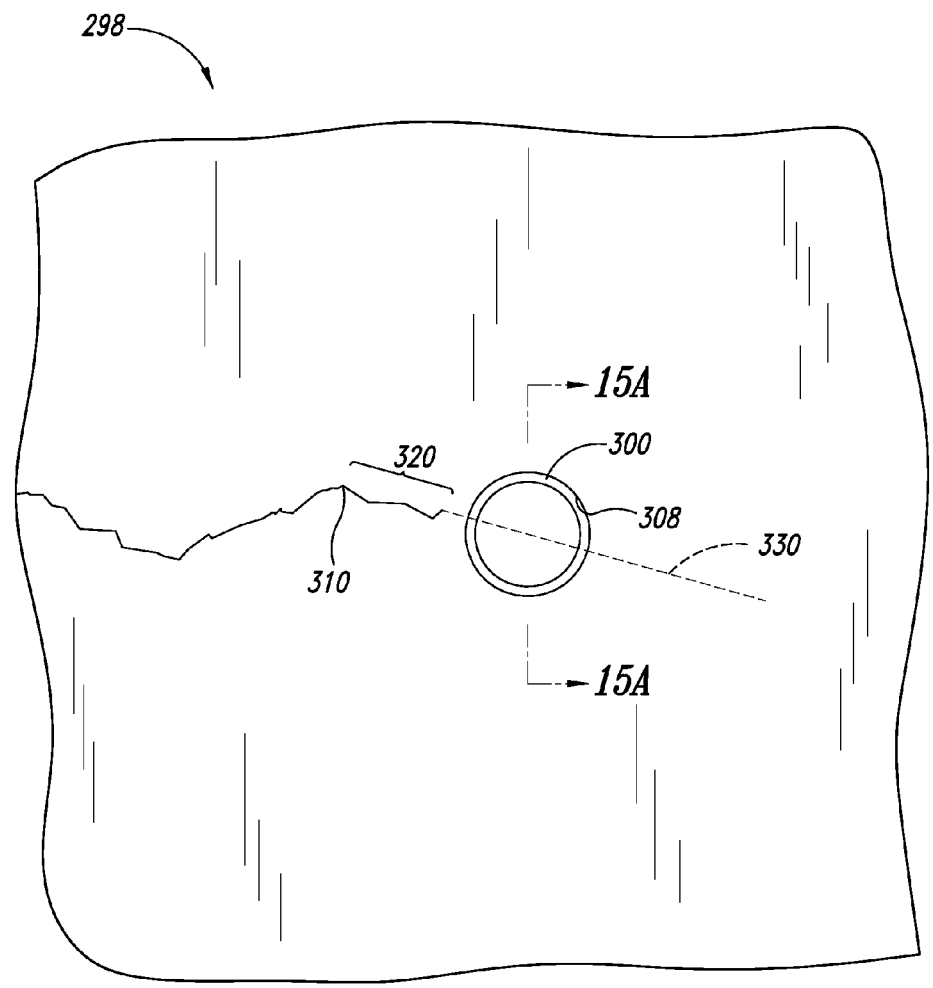
FIG. 15 is an elevational view of an installation with a sealed crack inhibitor installed in a workpiece.
Figure 18:
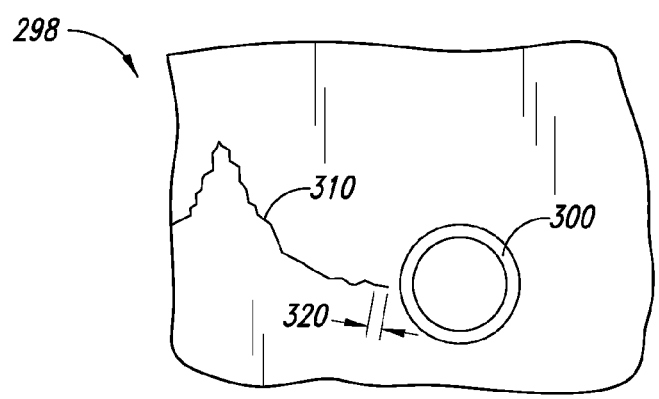

Referring to FIG. 15, a sealed installation 298 includes a crack inhibitor 300 positioned in front of a crack 310. To position the hole 308, a user can sample a relatively small section of the crack proximate to the tip of the crack. Based on the sampled section, an average direction of travel can be determined and used to predict an expected direction of continued crack propagation. The center of the hole 308 can be positioned along the expected path of travel of the crack. In FIG. 15, for example, a section 320 the crack 310 (e.g., an end section with a selected length of, for example, 0.03 inch to 0.1 inch) is evaluated to determine an imaginary line 330 (represented in dashed line) generally aligned with section 320. The center of the hole 308 is positioned along the line 330. As such, the crack inhibitor 300 is generally aligned with the path of the most recent crack propagation. In some embodiments, the length of the section 320 can be generally equal to the distance separating the tip of the crack 310 and the hole 108, as shown in FIG. 18.

Figure 15A:
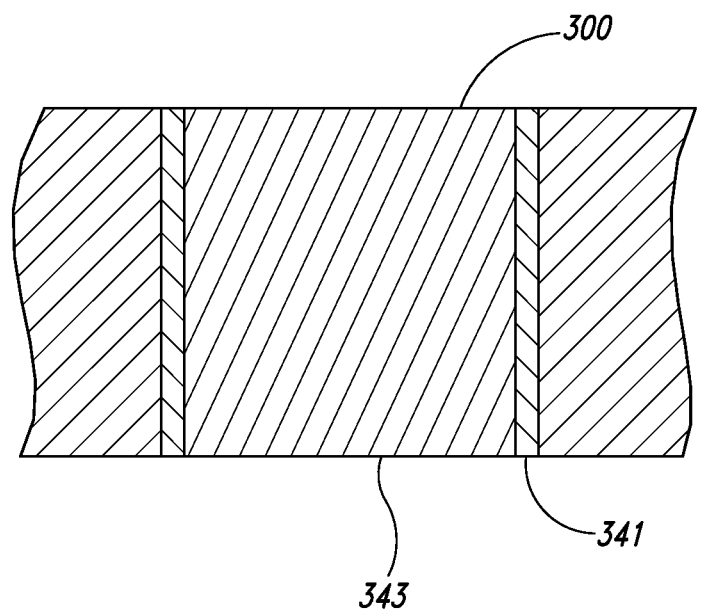
FIG. 15A is a cross-sectional view of the installation of FIG. 15 taken along a line 15A-15A.

FIG. 15A shows the crack inhibitor 300 including an outer member 341 (illustrated as a tubular member) and an inner member 343. The outer member 341 can be installed using an expansion process. The inner member 343 can be pulled into the expanded outer member 341. In some embodiments, the inner member 343 is a stud or a portion of a rod.

Figure 16:
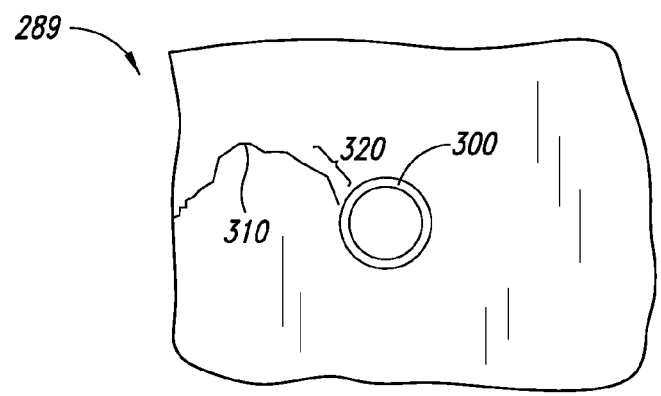
FIGS. 16-18 are elevational views of installations with crack inhibitors.
Figure 17:
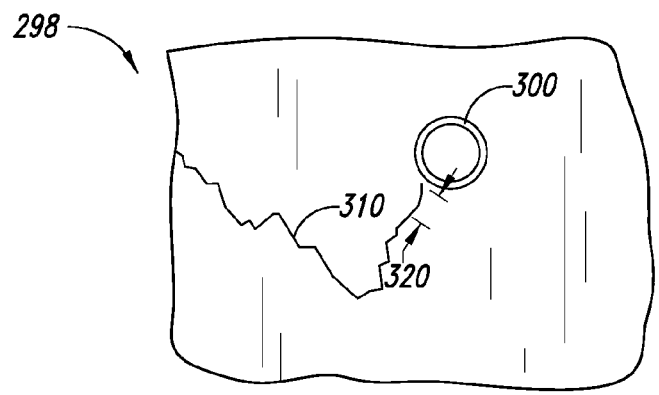

Different techniques can be used to determine the location of installation of the crack inhibitors. FIGS. 16-18 show various types of cracks 310 arrested by crack inhibitors 300. Sample sections 320 used to evaluate the path of travel of the crack are also illustrated. Crack inhibitors can also be installed at other locations in which compressive residual stresses will affect stresses around the tip of the crack to enhance fatigue performance. The crack inhibitors can help mitigate or inhibit the formation of oblique crack fronts, especially in thick workpieces. Unless the context requires otherwise, throughout the specification and claims which follow, the word "comprise" and variations thereof, such as, "comprises" and "comprising" are to be construed in an open, inclusive sense, that is as "including, but not limited to." As used in this specification and the appended claims, the singular forms "a," "an," and "the" include plural referents unless the content clearly dictates otherwise. It should also be noted that the term "or" is generally employed in its sense including "and/or" unless the content clearly dictates otherwise. Additionally, the headings and Abstract of the Disclosure provided herein are for convenience only and do not interpret the scope or meaning of the embodiments.

Except as described herein, the embodiments, features, systems, devices, materials, methods and techniques described herein may, in some embodiments, be similar to any one or more of the embodiments, features, systems, devices, materials, methods and techniques described in U.S. Pat. Nos. 3,566,662; 3,892,121; 4,164,807; 4,187,708; 4,423,619; 4,425,780; 4,471,643; 4,524,600; 4,557,033; 4,809,420; 4,885,829; 4,934,170; 5,083,363; 5,096,349; 5,405,228; 5,245,743; 5,103,548; 5,127,254; 5,305,627; 5,341,559; 5,380,136; 5,433,100; and in U.S. patent application Ser. No. 09/603,857, granted as U.S. Pat. No. 7,375,277; Ser. No. 10/726,809, granted as U.S. Pat. No. 7,100,264; Ser. No. 10/619,226, granted as U.S. Pat. No. 7,024,908; and Ser. No. 10/633,294, granted as U.S. Pat. No. 7,448,652, which are all incorporated herein by reference in their entireties. In addition, the embodiments, installation tools, features, systems, devices, materials, methods and techniques described herein may, in certain embodiments, be applied to or used in connection with any one or more of the embodiments, features, systems, devices, materials, methods and techniques disclosed in the incorporated U.S. Patents and Patent Applications. It is to be understood that not necessarily all objectives or advantages described herein may be achieved in accordance with any particular embodiment described herein.

Furthermore, the skilled artisan will recognize the interchangeability of various features from different embodiments disclosed herein. Similarly, the various features and steps discussed above, as well as other known equivalents for each such feature or step, can be mixed and matched by one of ordinary skill in this art to perform methods in accordance with principles described herein. Additionally, the methods which are described and illustrated herein are not limited to the exact sequence of acts described, nor are they necessarily limited to the practice of all of the acts set forth. Other sequences of events or acts, or less than all of the events, or simultaneous occurrence of the events, may be utilized in practicing the disclosed embodiments.

In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method of processing a workpiece, comprising:
   forming a hole in front of a crack such that the hole is spaced apart from a tip of the crack;
   positioning a crack inhibitor in the hole;
   expanding the crack inhibitor using an installation tool to produce compressive residual stresses in the material of the workpiece surrounding the hole; and
   separating the installation tool from the expanded crack inhibitor which maintains the compressive residual stresses to effect growth of the crack.

2. The method of claim 1, further comprising:
   producing substantially all of the compressive residual stresses in the material of the workpiece surrounding the hole by expanding the crack inhibitor.

3. The method of claim 1, wherein the hole, prior to expanding the crack inhibitor, is a non-cold worked hole.

4. The method of claim 1, wherein the hole, prior to expanding the crack inhibitor, is a cold worked hole.

5. The method of claim 1, further comprising:
   producing the compressive residual stresses by expanding the crack inhibitor such that the compressive residual stresses are sufficiently high to substantially reduce a rate of growth of the crack.

6. The method of claim 1, further comprising:
   counter balancing stresses in material of the workpiece around the crack tip using the compressive residual stresses.

7. The method of claim 1, wherein forming a hole includes forming a hole having a diameter of about 0.5 inch.

8. The method of claim 1, further comprising:

producing compressive residual stresses by expanding the crack inhibitor such that the compressive residual stresses substantially arrest any visible crack growth for at least about 1,000,000 cycles of loading, wherein the 1,000,000 cycles of loading would cause visible growth of the crack if the compressive residual stresses are not present.

9. The method of claim 1, further comprising:

producing compressive residual stresses by expanding the crack inhibitor such that the compressive residual stresses increase a number of cycles to reinitiate crack growth.

10. A kit for processing a workpiece, the kit comprising:

a crack inhibitor; and a set of instructions for processing the workpiece with the crack inhibitor, the instructions including forming a hole in front of a crack such that the hole is spaced apart from a tip of the crack;

positioning the crack inhibitor in the hole;

expanding the crack inhibitor using an installation tool to produce compressive residual stresses in the material of the workpiece surrounding the hole; and separating the installation tool from the expanded crack inhibitor which maintains the compressive residual stresses to effect growth of the crack.

* * * * *